US007748810B2

(12) United States Patent
Miyamoto et al.

(10) Patent No.: US 7,748,810 B2
(45) Date of Patent: Jul. 6, 2010

(54) IMAGE PROCESSING DEVICE, CALIBRATION TABLE GENERATOR, IMAGE PROCESSING METHOD, PROGRAM PRODUCT, AND TEST PATTERN

(75) Inventors: Toru Miyamoto, Shiojiri (JP); Atsushi Nagahara, Chino (JP); Yu Gu, Fuchu (JP); Toru Takahashi, Matsumoto (JP)

(73) Assignee: Seiko Epson Corporation (JP)

( * ) Notice: Subject to any disclaimer, the term of this patent is extended or adjusted under 35 U.S.C. 154(b) by 682 days.

(21) Appl. No.: 11/481,317

(22) Filed: Jul. 5, 2006

(65) Prior Publication Data
US 2007/0008355 A1    Jan. 11, 2007

(30) Foreign Application Priority Data
Jul. 5, 2005    (JP) .............................. 2005-196670
Jul. 19, 2005    (JP) .............................. 2005-209108

(51) Int. Cl.
B41J 29/38    (2006.01)
(52) U.S. Cl. ................................ 347/11; 347/19; 347/5
(58) Field of Classification Search ............... 347/9–11, 347/14–15, 19, 5
See application file for complete search history.

(56) References Cited

U.S. PATENT DOCUMENTS 6,000,776 A * 12/1999 Suzuki et al. .................. 347/19
2005/0122354 A1 * 6/2005 Yamane et al. ................ 347/11

FOREIGN PATENT DOCUMENTS

| JP | 01-129667 | 5/1989 |
| JP | 03-162977 | 7/1991 |
| JP | 05-057965 | 3/1993 |
| JP | 05-220977 | 8/1993 |
| JP | 09-083797 | 3/1997 |
| JP | 2004-174751 | 6/2004 |
| JP | 2005-109802 | 4/2005 |
| JP | 2007-074116 | 3/2007 |
| JP | 2007-118225 | 5/2007 |
| JP | 2007-134904 | 5/2007 |

* cited by examiner

*Primary Examiner*—Lam S Nguyen
(74) *Attorney, Agent, or Firm*—Harness, Dickey & Pierce, P.L.C.

(57) ABSTRACT

An image processing device includes a calibrator that calibrates a pixel value of a pixel in image data. An output interface outputs to an image output device the image data calibrated by the calibrator, the image output device forming an image in accordance with the calibrated image data, wherein the reference pixel and the target pixel have a predetermined positional relationship.

17 Claims, 24 Drawing Sheets

NOZZLE #00

| TARGET BRIGHTNESS / REFERENCE BRIGHTNESS | 0 | 51 | 102 | 153 | 204 | 255 |
|---|---|---|---|---|---|---|
| 0 | 20 | 28 | 37 | 52 | 60 | 89 |
| 51 | 27 | 34 | 54 | 74 | 83 | 116 |
| 102 | 31 | 45 | 65 | 89 | 98 | 133 |
| 153 | 42 | 60 | 83 | 110 | 124 | 161 |
| 204 | 53 | 74 | 100 | 135 | 149 | 196 |
| 255 | 72 | 96 | 128 | 171 | 187 | 242 |

NOZZLE #01

| TARGET BRIGHTNESS / REFERENCE BRIGHTNESS | 0 | 51 | 102 | 153 | 204 | 255 |
|---|---|---|---|---|---|---|
| 0 | 23 | 33 | 40 | 66 | 76 | 120 |
| 51 | 31 | 38 | 54 | 79 | 97 | 132 |
| 102 | 33 | 46 | 63 | 89 | 101 | 146 |
| 153 | 45 | 60 | 81 | 109 | 127 | 172 |
| 204 | 66 | 76 | 97 | 131 | 152 | 203 |
| 255 | 82 | 97 | 126 | 164 | 183 | 241 |

NOZZLE #02

| TARGET BRIGHTNESS / REFERENCE BRIGHTNESS | 0 | 51 | 102 | 153 | 204 | 255 |
|---|---|---|---|---|---|---|
| 0 | 19 | 25 | 33 | 49 | 58 | 95 |
| 51 | 26 | 31 | 48 | 66 | 79 | 112 |
| 102 | 29 | 40 | 58 | 79 | 91 | 129 |
| 153 | 41 | 56 | 78 | 104 | 115 | 161 |
| 204 | 55 | 74 | 99 | 129 | 148 | 199 |
| 255 | 77 | 97 | 127 | 170 | 187 | 245 |

FIG. 10A
S SIZE DOT (40%) 
M SIZE DOT (70%) 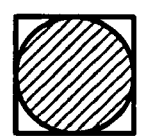
L SIZE DOT (100%) 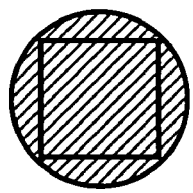
FIG. 10B
0%
20% 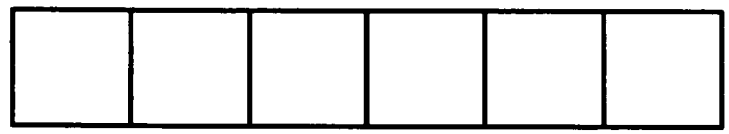
40% 
60% 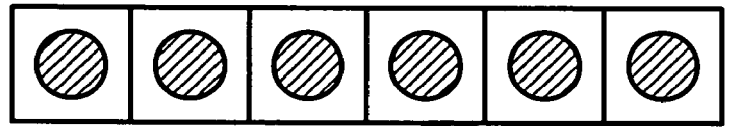
80% 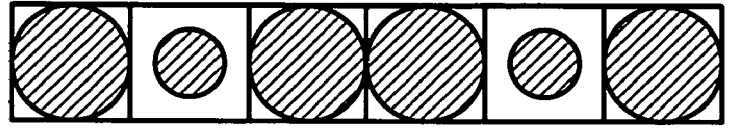
100% 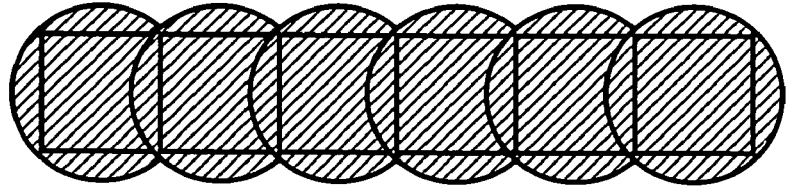

REFERENCE BRIGHTNESS: 0

| INPUT BRIGHTNESS | 0 | 51 | 102 | 153 | 204 | 255 |
|---|---|---|---|---|---|---|
| AVERAGE BRIGHTNESS | 20 | 28 | 37 | 52 | 80 | 89 |

REFERENCE BRIGHTNESS: 51

| INPUT BRIGHTNESS | 0 | 51 | 102 | 153 | 204 | 255 |
|---|---|---|---|---|---|---|
| AVERAGE BRIGHTNESS | 27 | 34 | 54 | 74 | 83 | 116 |

TARGET BRIGHTNESS: 0

| REFERENCE BRIGHTNESS | AVERAGE BRIGHTNESS |
|---|---|
| 0 | 19 |
| 51 | 26 |
| 102 | 29 |
| 153 | 41 |
| 204 | 55 |
| 255 | 77 |

TARGET BRIGHTNESS: 51

| REFERENCE BRIGHTNESS | AVERAGE BRIGHTNESS |
|---|---|
| 0 | 25 |
| 51 | 31 |
| 102 | 40 |
| 153 | 56 |
| 204 | 74 |
| 255 | 97 |

FIG. 13

NOZZLE #00

| TARGET BRIGHTNESS / REFERENCE BRIGHTNESS | 0 | 51 | 102 | 153 | 204 | 255 |
|---|---|---|---|---|---|---|
| 0 | 20 | 28 | 37 | 52 | 60 | 89 |
| 51 | 27 | 34 | 54 | 74 | 83 | 116 |
| 102 | 31 | 45 | 65 | 89 | 98 | 133 |
| 153 | 42 | 60 | 83 | 110 | 124 | 161 |
| 204 | 53 | 74 | 100 | 135 | 149 | 196 |
| 255 | 72 | 96 | 128 | 171 | 187 | 242 |

NOZZLE #01

| TARGET BRIGHTNESS / REFERENCE BRIGHTNESS | 0 | 51 | 102 | 153 | 204 | 255 |
|---|---|---|---|---|---|---|
| 0 | 23 | 33 | 40 | 66 | 76 | 120 |
| 51 | 31 | 38 | 54 | 79 | 97 | 132 |
| 102 | 33 | 46 | 63 | 89 | 101 | 146 |
| 153 | 45 | 60 | 81 | 109 | 127 | 172 |
| 204 | 66 | 76 | 97 | 131 | 152 | 203 |
| 255 | 82 | 97 | 126 | 164 | 183 | 241 |

NOZZLE #02

| TARGET BRIGHTNESS / REFERENCE BRIGHTNESS | 0 | 51 | 102 | 153 | 204 | 255 |
|---|---|---|---|---|---|---|
| 0 | 19 | 25 | 33 | 49 | 58 | 95 |
| 51 | 26 | 31 | 48 | 66 | 79 | 112 |
| 102 | 29 | 40 | 58 | 79 | 91 | 129 |
| 153 | 41 | 56 | 78 | 104 | 115 | 161 |
| 204 | 55 | 74 | 99 | 129 | 148 | 199 |
| 255 | 77 | 97 | 127 | 170 | 187 | 245 |

REFERENCE BRIGHTNESS: 0

| INPUT BRIGHTNESS | 0 | 51 | 102 | 153 | 204 | 255 |
|---|---|---|---|---|---|---|
| AVERAGE BRIGHTNESS | 20 | 28 | 37 | 52 | 80 | 89 |

REFERENCE BRIGHTNESS: 127

| INPUT BRIGHTNESS | 0 | 51 | 102 | 153 | 204 | 255 |
|---|---|---|---|---|---|---|
| AVERAGE BRIGHTNESS | 37 | 53 | 74 | 100 | 111 | 147 |

FIG. 27
| TB4 | TARGET BRIGHTNESS / REFERENCE BRIGHTNESS | 0 | 51 | 102 | 153 | 204 | 255 |
|---|---|---|---|---|---|---|---|
| NOZZLE #00 | 0 | 20 | 28 | 37 | 52 | 60 | 89 |
| | 127 | 37 | 53 | 74 | 100 | 111 | 147 |
| | 255 | 72 | 96 | 128 | 171 | 187 | 242 |
| | TARGET BRIGHTNESS / REFERENCE BRIGHTNESS | 0 | 51 | 102 | 153 | 204 | 255 |
|---|---|---|---|---|---|---|---|
| NOZZLE #01 | 0 | 23 | 33 | 40 | 66 | 76 | 120 |
| | 127 | 39 | 53 | 72 | 99 | 114 | 159 |
| | 255 | 82 | 97 | 126 | 164 | 183 | 241 |
| | TARGET BRIGHTNESS / REFERENCE BRIGHTNESS | 0 | 51 | 102 | 153 | 204 | 255 |
|---|---|---|---|---|---|---|---|
| NOZZLE #02 | 0 | 19 | 25 | 33 | 49 | 58 | 95 |
| | 127 | 35 | 48 | 68 | 92 | 103 | 145 |
| | 255 | 77 | 97 | 127 | 170 | 187 | 245 |
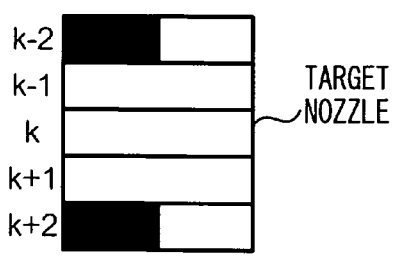
FIG. 29A
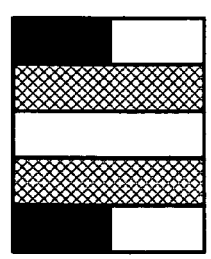
FIG. 29B
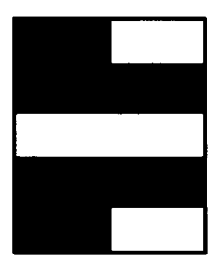
FIG. 29C

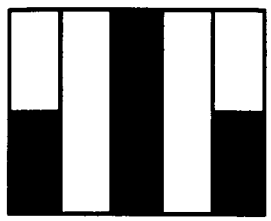
FIG. 30F
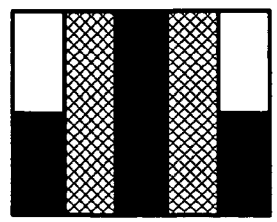
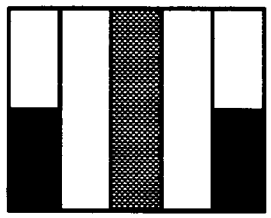
FIG. 30E
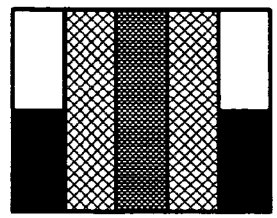
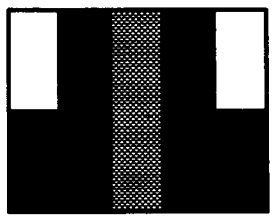
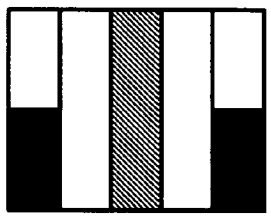
FIG. 30D
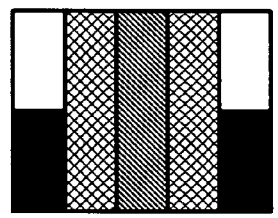
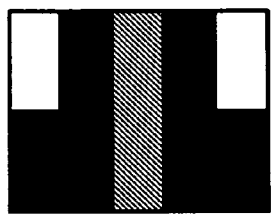
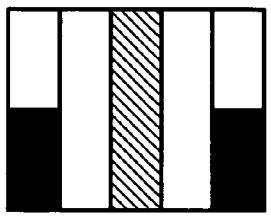
FIG. 30C
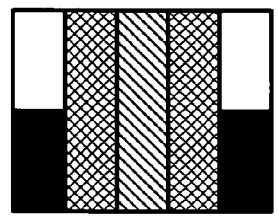
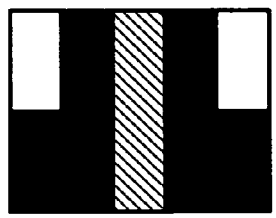
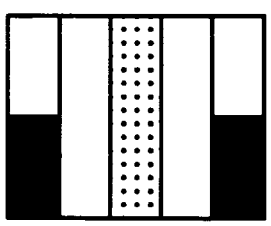
FIG. 30B
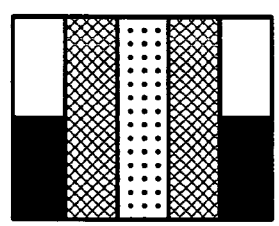
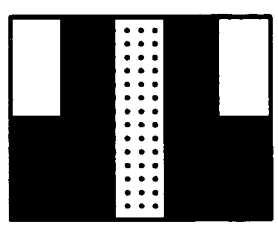
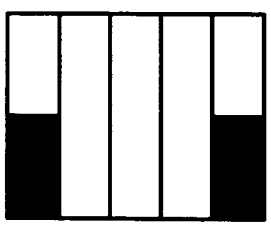
FIG. 30A
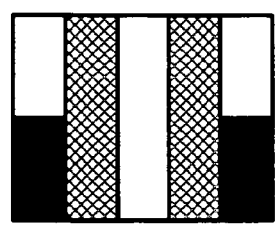

| TARGET NOZZLE / REFERENCE NOZZLE | 0 | 51 | 102 | 153 | 204 | 255 |
|---|---|---|---|---|---|---|
| L SIZE DOT | 20 | 28 | 37 | 52 | 60 | 89 |
| M SIZE DOT | 29 | 40 | 60 | 82 | 91 | 125 |
| S SIZE DOT | 48 | 67 | 92 | 123 | 137 | 179 |
| NO DOT | 72 | 96 | 128 | 171 | 187 | 242 |

FIG. 35

| TB7 | | | |
|---|---|---|---|
| BRIGHTNESS | S SIZE DOT | M SIZE DOT | S SIZE DOT |
| 0 | 0.00 | 0.00 | 1.00 |
| 10 | 0.00 | 0.05 | 0.95 |
| 20 | 0.10 | 0.05 | 0.90 |
| 30 | 0.10 | 0.10 | 0.80 |
| ⋮ | ⋮ | ⋮ | ⋮ |
| 85 | 0.00 | 1.00 | 0.00 |
| ⋮ | ⋮ | ⋮ | ⋮ |
| 170 | 1.00 | 0.00 | 0.00 |
| ⋮ | ⋮ | ⋮ | ⋮ |
| 255 | 0.00 | 0.00 | 0.00 |

FIG. 36

| REFERENCE NOZZLE \ TARGET NOZZLE | 0 | 51 | 102 | 153 | 204 | 255 |
|---|---|---|---|---|---|---|
| 10.0 | 20.5 | 28.6 | 38.1 | 53.5 | 61.5 | 90.8 |

FIG. 37
| REFERENCE NOZZLE \ TARGET NOZZLE | 0 | 51 | 102 | 153 | 204 | 255 |
|---|---|---|---|---|---|---|
| 0 | 20 | 28 | 37 | 52 | 60 | 89 |
| 85 | 29 | 40 | 60 | 82 | 91 | 125 |
| 170 | 48 | 67 | 92 | 123 | 137 | 179 |
| 255 | 72 | 96 | 128 | 171 | 187 | 242 |
TB6
FIG. 38
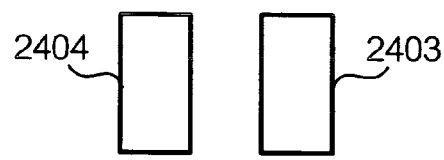
TB8
| NO DOT | S SIZE DOT | M SIZE DOT | L SIZE DOT |
|---|---|---|---|
| 0.0 | 0.3 | 0.7 | 1.00 |
FIG. 39
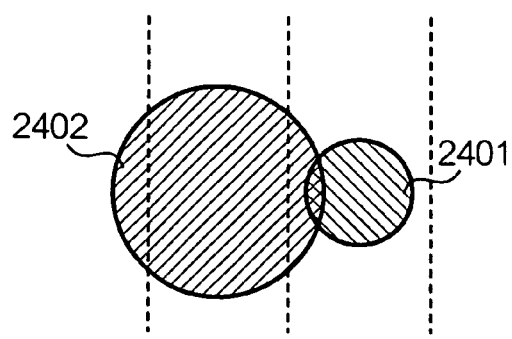

IMAGE PROCESSING DEVICE, CALIBRATION TABLE GENERATOR, IMAGE PROCESSING METHOD, PROGRAM PRODUCT, AND TEST PATTERN

The entire disclosures of Japanese Patent Application No. 2005-196670, filed Jul. 5, 2005 and Japanese Patent Application No. 2005-209108, filed Jul. 19, 2005 are expressly incorporated by reference herein.

BACKGROUND

1. Technical Field

The present invention relates to a technology for compensating for inconsistencies in ink density in a device that outputs a dot matrix.

2. Related Art

An image-forming device having an ink ejecting mechanism, such as an ink jet printer, has a plurality of nozzles, each for ejecting an ink dot in a droplet form, so as to perform high-speed printing. Ideally, the nozzles are spaced apart at precise intervals. However, in practice such nozzles tend not to be spaced apart at exactly correct intervals due to fabrication errors. Furthermore, a problem exists of a possible inconsistency in a volume of an ejected ink droplet. As a result of these problems images formed by ejected ink droplets may suffer from anomalies in position or size due to uneven ink dispersion. In other words, an image formed by ink droplets ejected from nozzles may suffer from deficiencies resulting from fabrication errors in nozzles. Particularly, in a so-called "one-pass printer" such as a line head printer that scans a print medium in a single direction, uneven dispersion can give rise to "banding".

To prevent banding, there are several known techniques that can be applied in image processing. For example, JP-A-1-129667, JP-A-3-162977, and JP-A-5-057965 disclose such technologies. JP-A-1-129667 discloses a technology for compensating for banding by using a calibration table. In JP-A-1-129667, an image-forming device stores a calibration table that includes calibration coefficients. The calibration coefficients are obtained by measuring printed densities of dots formed by a pattern, with all of the dots having a maximum density. When an image is formed, the corresponding calibration coefficient is multiplied to an appropriate pixel value. Thus, the inconsistencies in density are compensated for. JP-A-3-162977 discloses a linear calibration as well as the technology disclosed in JP-A-1-129667. JP-A-5-057965 discloses compensation using a plurality of calibration tables.

SUMMARY

However, the cited references disclose a calibration table that is generated on the basis of a single nozzle that is an object of calibration. In other words, adjacent nozzles are not taken into consideration when generating a calibration table. The technology in the cited references cannot prevent effects of the adjacent nozzles. Thus, there arises a problem in that the quality of the formed image becomes poor. Here, the effects of the adjacent nozzles are as follows.

FIG. 39 is a drawing showing effects of adjacent nozzles. FIG. 39 shows two dots (dots 2401 and 2402) that are formed on a print medium by two adjacent nozzles 2403 and 2404. For example, the dots 2401 and 2402 are formed in accordance with output data in which the pixel values are both "120". Without calibration, the density of the dot 2401 is measured as "110", and the density of the dot 2402 is measured as "130". In this case, the dot 2401 is calibrated so that the density of the dot 2401 becomes "120" (higher) while the dot 2402 is calibrated so that the density of the dot 2401 becomes "120" (lower). However, the measured density "110" of the dot 2401 depends on the fact that the density of the dot 2402 is "130". In other words, in FIG. 39, the measured density "110" of the dot 2401 includes overlap of the dot 2402. The density of the dot 2401 itself is less than "110". Therefore, a desired print density cannot be obtained by merely calibrating the density from 110 to 120. As stated, the reason is that calibration is carried out without taking into consideration a characteristic of an adjacent nozzle (or adjacent pixel).

An advantage of an aspect of the invention is to provide calibrated image processing in which a characteristic of an adjacent nozzle (or adjacent pixel) is taken into account.

According to a first aspect of the invention, an image processing device includes: a memory that stores a table, the table including a pixel value of a target pixel, a pixel value of a reference pixel, and a pixel value corresponding to the pixel values of the target pixel and the reference pixel, the target pixel and the reference pixel being included in image data, the image data including a plurality of pixels, each of the plurality of pixels having a pixel value, the reference pixel being a pixel other than the target pixel; a calibrator that calibrates a pixel value of a pixel included in the image data, by using the table stored in the memory; an output interface that outputs to an image output device the image data calibrated by the calibrator, the image output device forming an image in accordance with the calibrated image data, wherein the reference pixel and the target pixel have a predetermined positional relationship.

It is preferable that the image output device is an image-forming device having a plurality of nozzles, each of which ejects an ink droplet.

It is preferable that the image output device is a display device that forms an image by visible radiation.

It is preferable that the reference pixel is a pixel formed by a reference nozzle that has a predetermined positional relationship with a target nozzle, the target nozzle being a nozzle that is used to form the target pixel.

It is preferable that the reference nozzle is adjacent to the target nozzle.

It is preferable that the reference pixel is formed by a target nozzle, the target nozzle being used to form the target pixel.

It is preferable that the table includes a pixel value of a target pixel, a pixel value of a first reference pixel, a pixel value of a second reference pixel, and a pixel value corresponding to the pixel values of the target pixel and the first and the second reference pixels, the first pixel and the target pixel having a predetermined positional relationship, the second pixel and the target pixel having another predetermined positional relationship.

It is preferable that the first reference pixel is adjacent to the target pixel; and the second reference pixel is adjacent to the first reference pixel.

It is preferable that the memory stores at least a first table and a second table; and a first line and a second line is orthogonal, the first line including a target pixel and a reference pixel of the first table, the second line including a target pixel and a reference pixel of the second table.

It is preferable that the table includes M-number of pixel values of the target pixel and N-number of pixel values of the reference pixel, the numbers M and N being integers that satisfies M>N.

It is preferable that the number M equals to a number of gradation that a reference nozzle can represent, the reference nozzle being a nozzle that forms the reference pixel.

It is preferable that the table includes pixel values of at least two reference pixels, the two reference pixel including a first reference pixel and a second reference pixel; the distance between the second reference pixel and the target pixel is less than the distance between the first reference pixel and the target pixel; and the table includes M-number of pixel values of the target pixel, N1-number of pixel values of the first reference pixel, and N2-number of pixel values of the second reference pixel, the numbers M, N1, and N2 being integers that satisfies M>N2>N1.

It is preferable that the second reference pixel is adjacent to the target pixel; and the first reference pixel is adjacent to the first reference pixel.

It is preferable that the reference pixel is a pixel that formed by a reference nozzle, the reference nozzle satisfying a predetermined positional condition between a target nozzle, the target nozzle corresponding to the target pixel.

It is preferable that the reference nozzle is adjacent to the target nozzle.

According to a second aspect of the invention, a calibration table generator, includes: a memory that stores image data showing a test pattern; an output interface that outputs the image data to an image-forming device, the image-forming device including a plurality of nozzles, each of which ejects an ink droplet in accordance with image data; an image reading device that generates image data on the basis of an image formed on a print medium; a calculator that calculates densities of a target pixel and a reference pixel on the basis of the image data generated by the image reading device, the target pixel being formed by a target nozzle that is an object of the calibration, the reference pixel being formed by a reference nozzle, the reference nozzle satisfying a predetermined positional relationship with the target nozzle; a table generator that generates a calibration table on the basis of the densities of the target pixel and the reference pixel.

It is preferable that the test pattern includes a target unit pattern and a reference unit pattern, the target unit pattern including a pixel that is formed by the target nozzle, the reference unit pattern including a pixel that is formed by the reference nozzle, a number M of gradation in the target unit pattern and a number N of gradation in the reference unit pattern satisfy M>N.

It is preferable that the reference nozzle includes at least a first reference nozzle and the second reference nozzle; the distance between the second reference nozzle and the target nozzle is less than the distance between the first reference nozzle and the target nozzle; the reference pattern includes at least a first reference pattern and a second reference pattern, the first reference pattern being formed by the first reference nozzle, the second reference pattern being formed by the second reference nozzle, and a number M of gradation in the target unit pattern, a number N1 of gradation in the first reference unit pattern, and a number N2 of gradation in the second reference unit pattern satisfy M>N2>N1.

According to a third aspect of the invention, an image-processing method, includes: reading a table from a memory, the table including a pixel value of a target pixel, a pixel value of a reference pixel, and a pixel value corresponding to the pixel values of the target pixel and the reference pixel, the target pixel and the reference pixel being included in image data, the image data including a plurality of pixels, each of the plurality of pixels having a pixel value, the reference pixel being a pixel other than the target pixel; calibrating a pixel value of a pixel included in the image data, by using the table stored in the memory; outputting to an image output device the image data calibrated by the calibrator, the image output device forming an image in accordance with the calibrated image data, wherein the reference pixel and the target pixel have a predetermined positional relationship.

According to a fourth aspect of the invention, a program product for causing a computer device to execute: reading of a table from a memory, the table including a pixel value of a target pixel, a pixel value of a reference pixel, and a pixel value corresponding to the pixel values of the target pixel and the reference pixel, the target pixel and the reference pixel being included in image data, the image data including a plurality of pixels, each of the plurality of pixels having a pixel value, the reference pixel being a pixel other than the target pixel; calibrating a pixel value of a pixel included in the image data, by using the table stored in the memory; outputting to an image output device the image data calibrated by the calibrator, the image output device forming an image in accordance with the calibrated image data, wherein the reference pixel and the target pixel have a predetermined positional relationship.

According to a fifth aspect of the invention, a test pattern, includes: a group of target unit patterns, each target unit pattern including u pixels, the u pixels being laid-out linearly, and said each target unit pattern including a target pixel; a group of reference unit patterns that includes a plurality of reference unit patterns, each of said reference unit pattern included in the reference group having a predetermined positional relationship with the group of target unit pattern; wherein a reference unit pattern located adjacent to the target unit pattern includes a plurality of unit patterns, each of which has a different density.

BRIEF DESCRIPTION OF DRAWINGS

The invention will be described with reference to the accompanying drawings, wherein like numbers reference like elements.

FIGS. 10A and 10B show a method for representing a halftone in a unit pattern.

FIG. 13 shows an example of a part of the calibration table TB1.

FIG. 27 shows an example of a part of the calibration table TB4.

FIGS. 29A-29C show a part of test pattern 361 in accordance with the sixth embodiment.

FIG. 30 shows a part of test pattern 361 in accordance with the sixth embodiment FIG. 31 schematically illustrates a structure of the calibration table TB5.

FIG. 35 shows an example of the dot ratio table TB7.

FIG. 36 shows an example of a table of calibrated value F.

FIG. 37 shows a table obtained by converting the dot size into brightness.

FIG. 38 shows an example of a part of a dot ratio table TB8 in the seventh embodiment.

FIG. 39 is a drawing showing effects of adjacent nozzles.

DESCRIPTION OF EXEMPLARY EMBODIMENTS

First Embodiment

Image-Forming System

Figure 1:
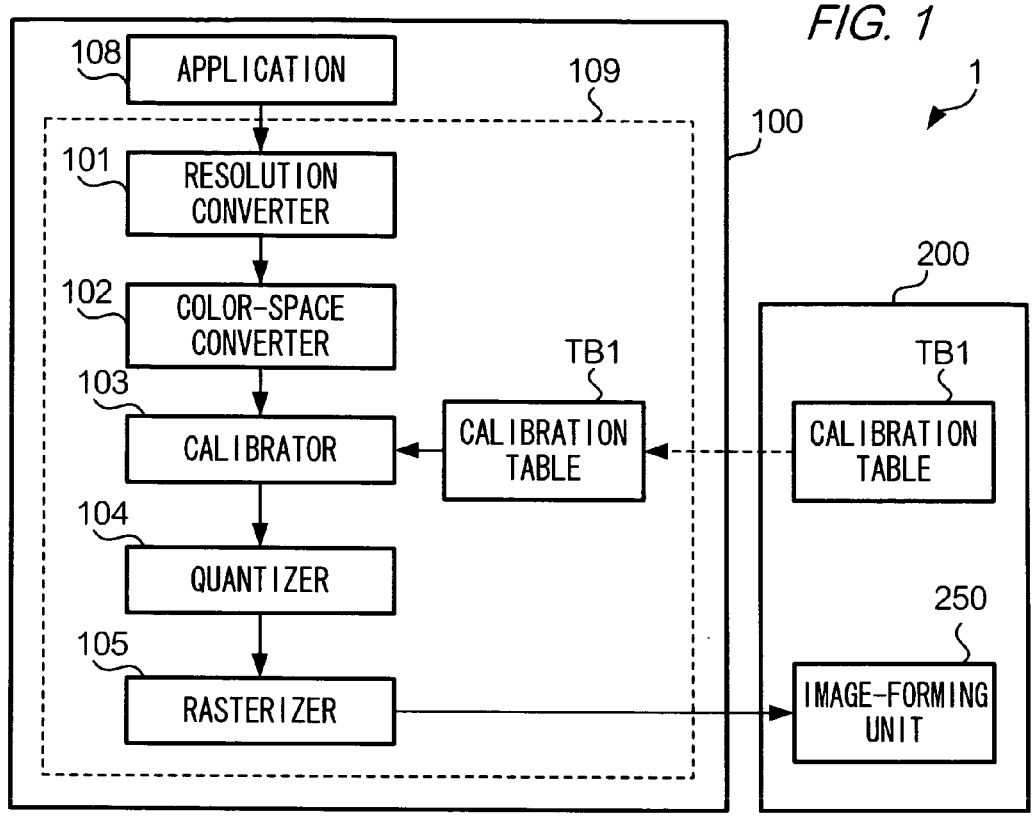
FIG. 1 shows a block diagram illustrating a functional configuration of an image-forming system 1 in accordance with the first embodiment.

FIG. 1 shows a block diagram illustrating a functional configuration of an image-forming system 1 in accordance with the first embodiment of the present invention. The image-forming system 1 includes an image-forming device 200 and a PC (Personal Computer) 100. The image-forming device 200 is a device that ejects ink droplets in accordance with control data, to thereby form an image on a print medium (a sheet of paper, for example). The PC 100 is a computer device that controls the image-forming device 200. An application 108 and a device driver 109 are installed in the PC 100. The application 108 includes, for example, a word processor or an image processor. The device driver 109 includes software for controlling the image processing device 200. The application 108 outputs image data to the device driver 109, in response to, for example, an instruction input by a user. The image data includes a plurality of pixels. Each pixel has a pixel value (a density, and a brightness). The device driver 109 functions to convert the image data into control data, and output the control data to the image-forming device 200. The image data includes multi-level values defined in accordance with a color system, for example, an RGB (Red-Green-Blue) color system. The control data includes binary values described in another color system, for example, a CMYK (Cyan-Magenta-Yellow-blacK) color system.

The device driver 109 functions as follows. A resolution converter 101 converts a resolution of image data so that the resolution of the image data conforms to that set for the image-forming device 200. A color-space converter 102 converts the color spacing of the image data to conform it to that set for the image-forming device 200, for example, from RGB to CMYK. A calibrator 103 calibrates the pixel value of a pixel of the image data, with reference to a calibration table TB1. The calibration table TB1 is obtained from the image-forming device 200. Details of the calibration table TB1 will be described later. A quantizer 104 converts the multi-level CMYK data into binary CMYK data. In other words, the quantizer 104 binarizes (or quantizes) the data. A rasterizer 105 generates control data on the basis of the binary CMYK data. An image-forming unit 250 in the image-forming device 200 ejects ink droplets of each color in accordance with the control data. Thus, the image-forming system 1 forms an image on a print medium.

Figure 2:
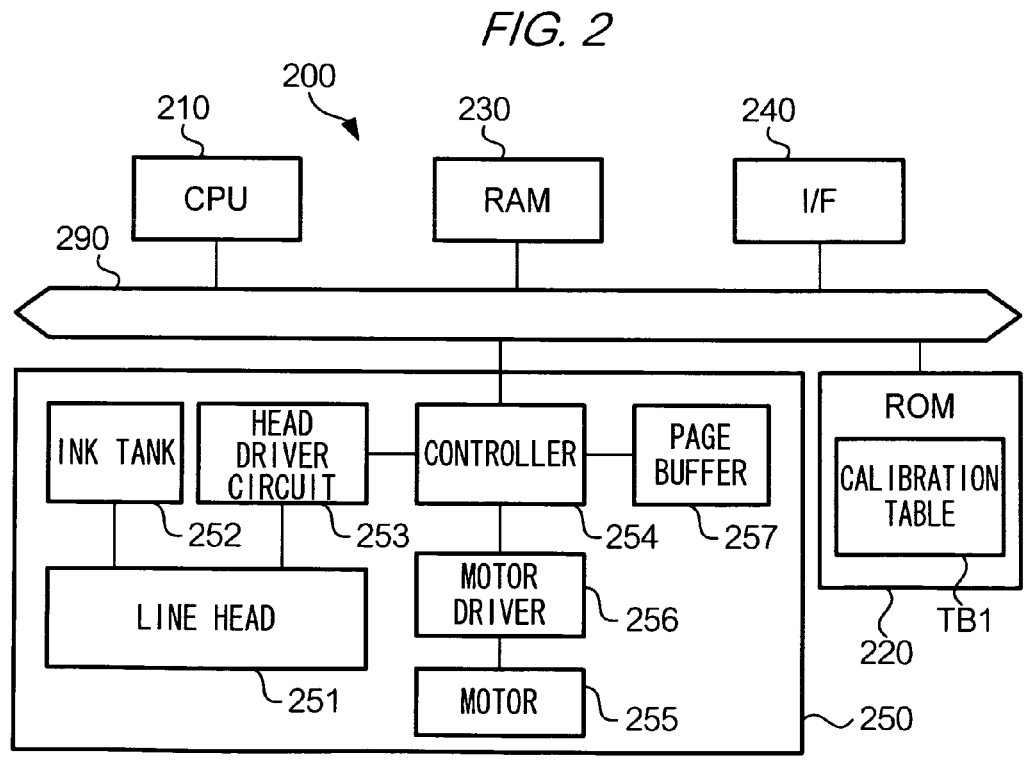
FIG. 2 shows a block diagram illustrating a hardware configuration of the image-forming device 200.

FIG. 2 shows a block diagram illustrating a hardware configuration of the image-forming device 200. In the present embodiment, the image-forming device 200 is an ink jet printer having a so-called "line head". The line head is a print head employed in one-pass printing. A CPU (Central Processing Unit) 210 executes a printing program stored in a ROM (Read Only Memory) 220. The ROM 220 stores a calibration table that is unique to the image-forming device 200. The ROM 220 may be an EEPROM (Electronically Erasable and Programmable Read Only Memory) that is a rewritable memory. A RAM (Random Access Memory) 230 functions as a work area when the CPU 210 executes a program. An I/F 240 is an interface for inputting/outputting data or control signals from/to other devices such as the PC 100. The RAM 230 also stores data received via the I/F 240. The image-forming unit 250 forms an image on a print medium under the control of the CPU 210, in accordance with the control data. The elements described above are connected via a bus 290. By the CPU 210 executing the application 108 and device driver 109, the image-forming device 200 has functions shown in FIG. 1.

In addition, the image-forming unit 250 has functions as follows. A line head 251 is a printing head having a plurality of nozzles (z nozzles), each of which ejects an ink droplet. The nozzles are not shown in the figures. The nozzle may be a piezoelectric nozzle that ejects an ink droplet using piezoelectric effect. Alternatively, the nozzle may be a heating nozzle that ejects an ink droplet by heating the ink. In addition, the nozzle may have any kind of structure. The line head 251 has a size that is greater than a maximum size of a sheet of paper that is available in the image-forming device 200. An ink tank 252 stores ink and provides the ink to the nozzles. The ink tank 252 has a separated storage area for each color. In the present embodiment, the image-forming device 200 forms an image by using four ink colors. However, the image-forming device 200 may use more than four ink colors. For example, the image-forming device may use six or seven ink colors. A page buffer 257 is a memory that stores nozzle control data corresponding to one page of an image. Under the control of a controller 254, a head driver circuit 253 outputs to the line head 251 a control signal that causes a target nozzle to eject an ink droplet. The target nozzle is a nozzle designated from among the plurality of nozzles on the line head 251. Thus, an ink droplet is ejected from the target nozzle. The ink droplet forms part of an image on a sheet of paper. In the following, the word "ON" is used to describe a situation where an ink droplet is ejected from a nozzle relative to a dot; while "OFF" is used to describe a situation where an ink droplet is not ejected from a nozzle relative to a dot. For example, "data showing ON/OFF of a dot" is data showing whether an ink droplet is ejected from a target nozzle. The term "dot" refers to a part of an image formed by an ink droplet ejected by a nozzle.

Since the line head 251 has a size that is larger than a width of a sheet of paper, the line head 251 is able to form dots corresponding to a whole line on a sheet of paper. A motor 255 feeds a sheet of paper in a predetermined direction. A motor driver 256 outputs to the motor 255 a drive signal under control of the controller 254. After the motor is driven to feed a sheet of paper to the next line, dots in the next line are formed. The image-forming device 200 is able to form an image on a sheet of paper using a unidirectional/single scan (or a unidirectional single feed of a sheet of paper).

Figure 3:
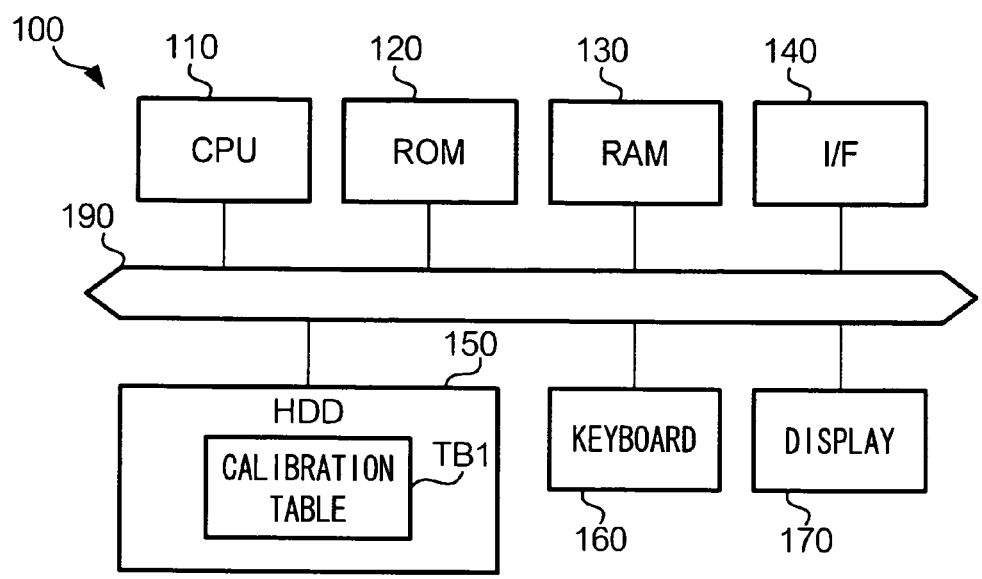
FIG. 3 shows a block diagram illustrating a hardware configuration of the PC 100.

FIG. 3 shows a block diagram illustrating a hardware configuration of the PC 100. A CPU 110 is a controller that controls components of the PC 100. The CPU 110 executes a data-generating program (or a device driver) that is stored in a HDD (Hard Disk Drive) 150. A RAM 130 functions as a work area when the CPU 110 executes a program. A ROM 120 stores data and a program for controlling the PC 100. An I/F 140 is an interface for inputting/outputting data or a control signal with other devices such as the image-forming device 200. The HDD 150 is a storage device that stores various data and programs. The HDD 150 stores a calibration table that is obtained from the image-forming device 200. A keyboard 160 and a display 170 are user interfaces that enable a user to input an instruction or data and to display information. The components described above are mutually connected via a bus 190. The CPU 110 when executing control of the data generating program, has the functions shown in FIG. 1. Although not shown in the figures, the PC 100 and the image-forming device 200 are connected by a wireless or a wired communication via the I/F 140 and the I/F 240.

Figure 4:
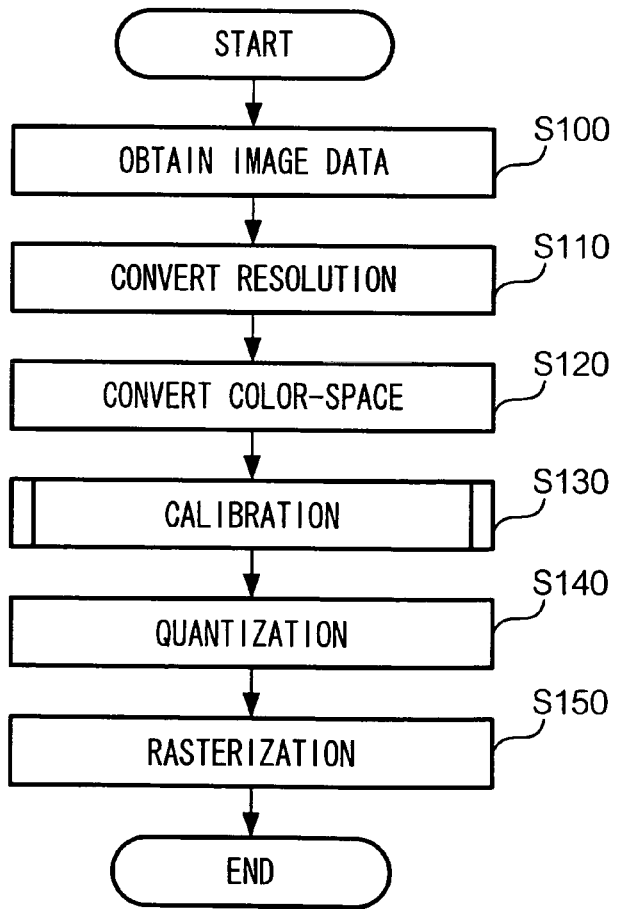
FIG. 4 is a flowchart illustrating operations of the image-forming system 1.

FIG. 4 is a flowchart illustrating operations of the image-forming system 1. When power is supplied to the image-forming device 200, the CPU 210 reads a printing program from the ROM 220 and executes the program. Executing the printing program, the CPU 210 waits for input of control data. When an instruction for printing is input from the application 108, the CPU 210 reads the device driver 109 from the HDD 150 and executes the device driver 109. First, in step S100, the CPU 110 obtain target image data from the HDD 150 and stores the target image data in RAM 130. The target image data is an object of the processing. In the present embodiment, the image data is RGB multi-level color data. The image-forming device 200 is an ink jet printer that forms an image by using four colors, CMYK, of inks. Therefore it is required to convert the color space of the image data from RGB into CMYK. Furthermore, the input (or original) image data includes a plurality of pixels, each of which has a multi-level pixel value. However, the nozzle of the image-forming device 200 can represent only two levels, ON and OFF of a dot having a certain size, and cannot represent a halftone. In the present embodiment, the image-forming device 200 can form three dot sizes, S, M, and L. In the image-forming device 200, a pixel in the original image data corresponds to a dot matrix having a size of a dots×b dots. After resolution conversion, a pixel corresponds to a dot. The halftone of the original pixel is represented by a number of ON dots in the dot matrix. Therefore, it is required to convert the image data into control data showing ON/OFF of a dot. It is to be noted that the number of dot sizes that can be formed by the image-forming device is not restricted to three.

Then, the CPU 110 obtains a resolution of the input image data. When the resolution of the input image data is different from the resolution available in the image-forming device 200, the CPU 110 converts the resolution of the image data so that the image data has the resolution available in the image-forming device 200 (in step S110). The CPU 110 stores in the RAM 130 the image data having the converted resolution. In step S120, the CPU 110 converts the color space of the image data from RGB into CMYK so that the image data conforms to the image-forming device 200. The CPU 110 stores in the RAM 130 the image data having the converted color space. In step S130, the CPU 110 calibrates a pixel value of the image data. Details of the calibration will be described later.

In step S140, the CPU 110 binarizes (quantizes) the image data by, for example, a dither matrix method or an error diffusion method. The CPU 110 stores in the RAM 130 the binarized image data. In step S150, the CPU 110 performs rasterization by which control data is generated from the image data. The CPU 210 outputs the generated control data to the image-forming device 200. The image-forming unit 250 of the image-forming device 200 forms an image in accordance with the control data. Thus, an image in which the densities of the pixels have been calibrated is formed on a sheet of paper.

1-2. Generating a Calibration Table

Here, a method for generating the calibration table TB1 will be described. In the following, a calibration table for black ink is described as an example, but it should be noted that calibration tables are generated for all colors.

Figure 5:
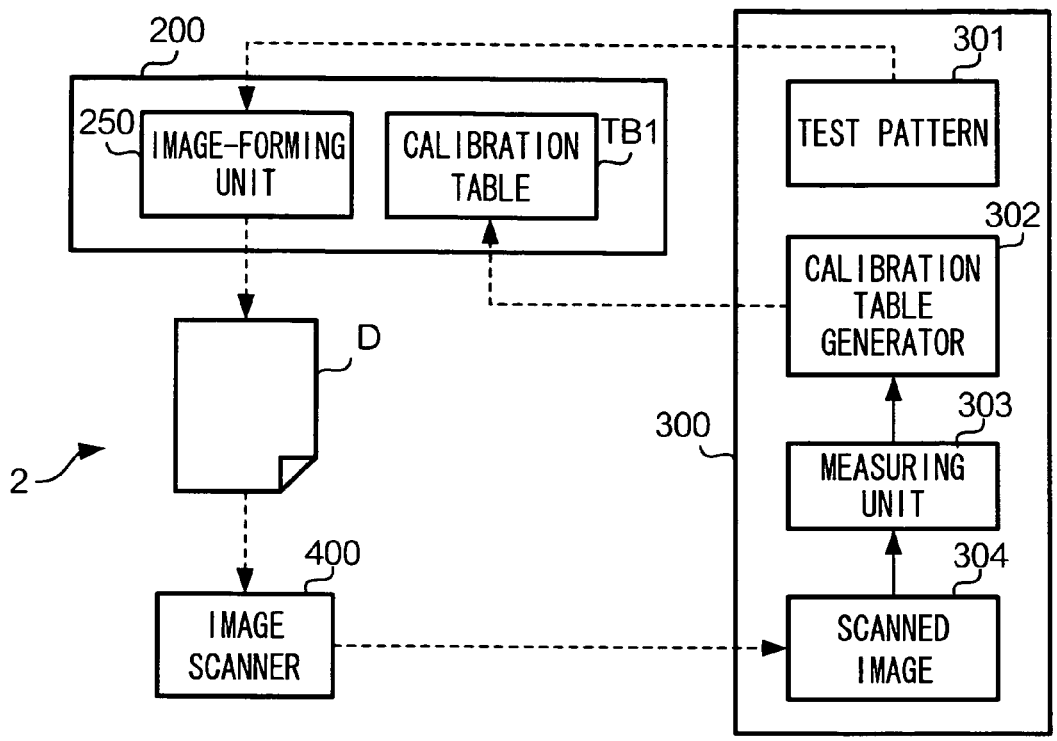
FIG. 5 shows a block diagram illustrating a functional configuration of a calibration table generating system 2.

FIG. 5 shows a block diagram illustrating a functional configuration of a calibration table generating system 2 in accordance with the present embodiment. The calibration table generating system 2 includes the image-forming device 200, a PC 300, and an image scanner 400. The PC 300 and the image-forming device 200 are connected via a wired or a wireless communication. The PC 300 and the image scanner 400 are also connected similarly. The PC 300 stores a test pattern 301 that is used for generating the calibration table. The image-forming unit 250 forms image D in accordance with the test pattern 301. The image scanner 400 reads the image D and generates image data that is referred to as "scanned image". The scanner 400 outputs the scanned image to the PC 300. The PC 300 stores the received scanned image as scanned image 304. A measuring unit 303 in the PC 300 calculates (or measures) the densities of the pixels in the scanned image 304. A table generator 302 generates a calibration table on the basis of the measurement result provided by the measuring unit 303. The image-forming device stores the generated calibration table as the calibration table TB1.

Figure 6:
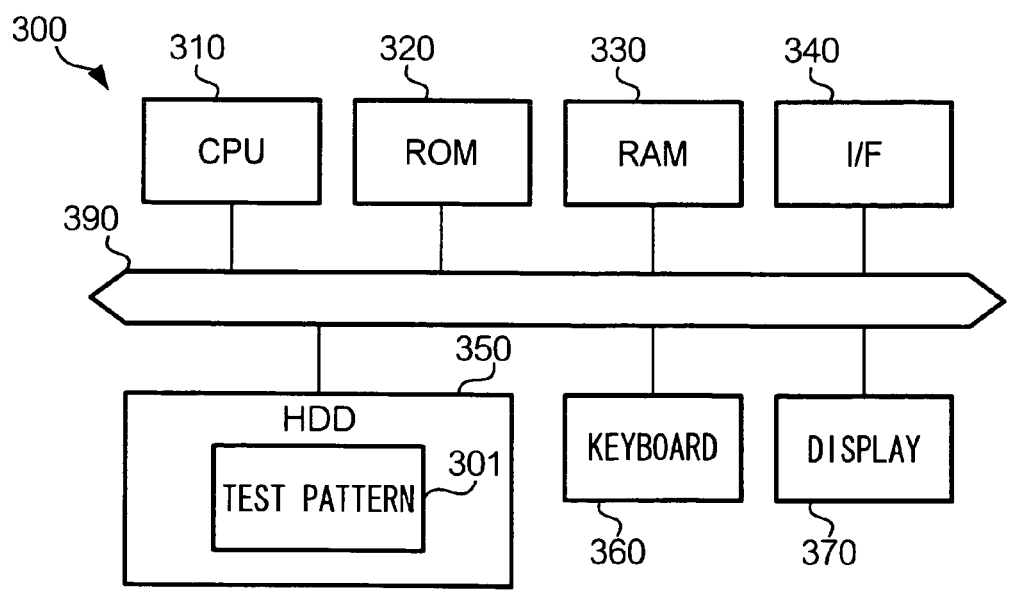
FIG. 6 shows a block diagram illustrating a hardware configuration of the PC 300.

FIG. 6 shows a block diagram illustrating a hardware configuration of the PC 300. The hardware configuration of the PC 300 is essentially similar to that of the PC 100. The differences between the PC 300 and the PC 100 are as follows. A HDD 350 stores the test pattern 301. In addition, the HDD 350 stores a table-generating program for generating a calibration table.

Figure 7:
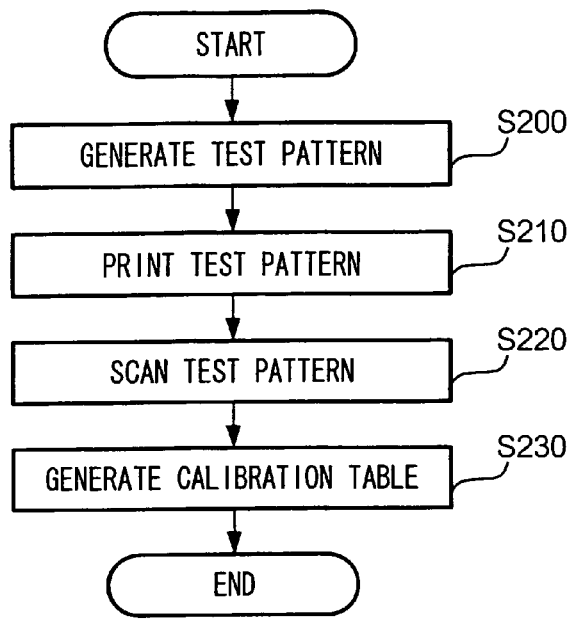
FIG. 7 is a flowchart illustrating operations for generating the calibration table.

FIG. 7 is a flowchart illustrating operations for generating the calibration table. When a user inputs via the keyboard 360 an instruction for generating a test pattern, the CPU 310 in the PC 300 reads the table-generating program and executes the program. In step S200, the CPU 310 generates a test pattern. Specifically, the CPU 310 reads the test pattern 301 from the HDD 350. The CPU 310 outputs the data showing the test pattern 301 via I/F 340 to the image-forming device 200.

Figure 8:
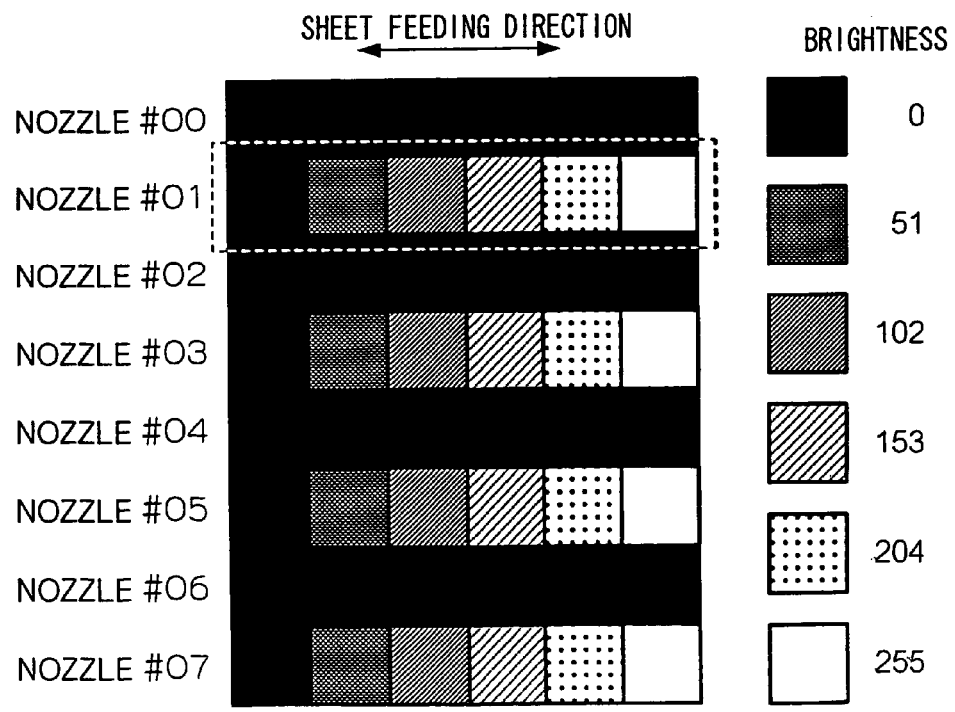
FIG. 8 shows a basic pattern of a test pattern.

FIGS. 8 and 9 show an example of a part of test pattern 301. FIG. 8 shows a basic pattern of a test pattern for eight nozzles, which nozzles are referred to respectively as nozzles #00-

07. In FIG. 8, the nozzles are laid-out in a top-bottom direction (vertically), and the print media is fed in a right-left direction (horizontally). In the present embodiment, a calibrated value (correction value) of a target pixel is determined on the basis of pixel values of the target pixel and a reference pixel. The target pixel is a pixel that is an object of processing. The reference pixel is a pixel that is other than the target pixel, and is determined by a predetermined algorithm. In the present embodiment, the reference pixel is a pixel that corresponds to a dot formed by an ink droplet ejected by a nozzle located adjacent to a target nozzle. The target nozzle is a nozzle that ejects an ink droplet to form a dot corresponding to the target pixel. The test pattern 301 is generated in a case that the reference pixel is a pixel that corresponds to a dot formed by an ink droplet ejected by a nozzle located adjacent to a target nozzle. In the present embodiment, the "target nozzle" and the "reference nozzle" correspond to the "target pixel" and the "reference pixel", respectively.

In the example shown in FIG. 8, the basic pattern includes a pattern for the nozzles #00, #02, #04, and #06 whose brightness is constant at 0 (zero). It is to be noted that the term "brightness" means brightness of a pixel. Similar to the "density" of a pixel, the brightness shows a pixel value of a pixel. When brightness of a dot is at a maximum, the pixel value of the dot is at a minimum. When brightness of a dot is at a minimum, the pixel value of the dot is at a maximum. On the contrary, the basic pattern includes a pattern for the nozzles #01, #03, #05, and #07 whose brightness varies, for example, 0, 51, 102, 153, 204, and 255. In other words, the basic pattern for the nozzles #01, #03, #05, and #07 includes a plurality of areas whose brightness is different from each other. In a case that the target nozzle is the nozzle #01, the reference nozzle is the nozzle #00. In other words, the test pattern 301 includes an area for the reference nozzle, in which the brightness is maintained constant at a predetermined value. Furthermore, the test pattern 301 includes a plurality of areas for the target nozzle, in which the brightness is varied.

Figure 9A:
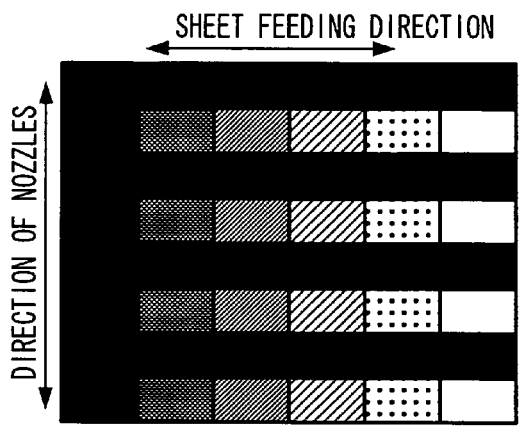
FIGS. 9A-9F show six basic patterns.
Figure 9D:
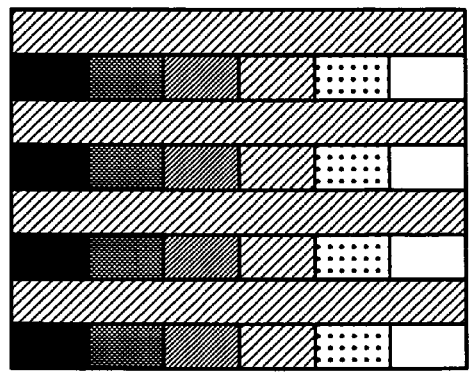
Figure 9B:
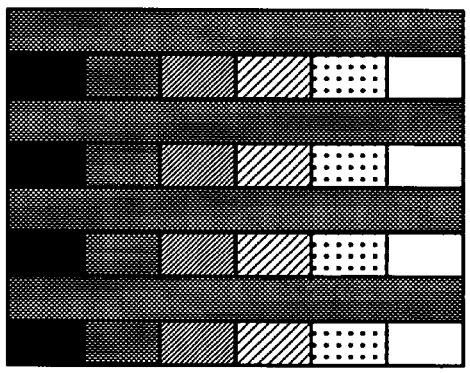
Figure 9E:
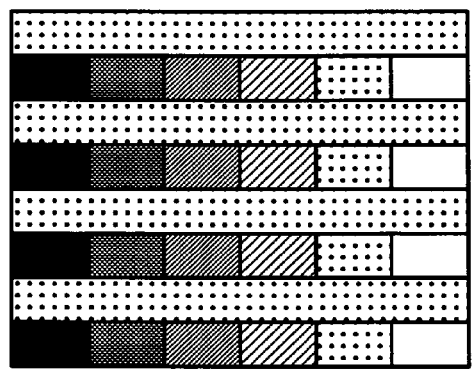
Figure 9C:
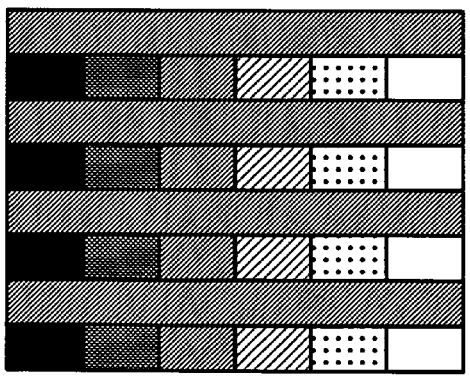
Figure 9F:
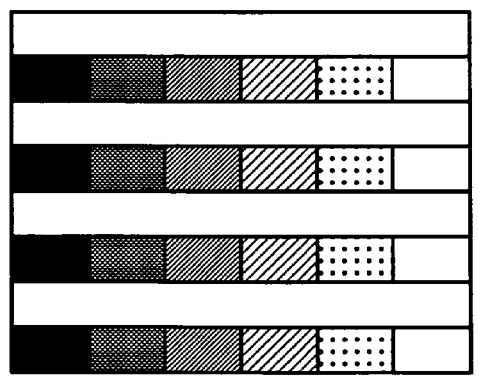

FIGS. 9A-9F show six basic patterns used in the present embodiment. The basic pattern shown in FIG. 9A is the same as that shown in FIG. 8. For the basic patterns shown in FIGS. 9A-9F, the brightness of the reference nozzle is different. Specifically, the reference brightness is 0, 51, 102, 153, 204, and 255, respectively. The "reference brightness" means brightness of the reference nozzle. By using the basic patterns shown in FIGS. 9A-9F, calibration data is obtained for thirty-six (=6×6) combinations, six patterns for the target nozzle by six patterns for the reference nozzle. In general, to obtain calibration data for $c^2$ combinations, c patterns for the target nozzle by c patterns for the reference nozzle, c basic patterns are required.

In FIGS. 8 and 9A-9F, a unit area that has a constant brightness is referred to as a "unit pattern". For example, in FIG. 8, the pattern for the nozzle #01 includes six unit patterns.

FIGS. 10A and 10B show a method for representing a halftone in a unit pattern. FIG. 10A shows dot sizes that can be formed by a nozzle. As shown in FIG. 10A, the image-forming device 200 can form three sizes, S, M, and L size of dots. The density of S, M, and L size dot is 40%, 70%, and 100%, respectively. FIG. 10B shows a method for representing a halftone in a unit pattern having a density of 0%, 20%, 40%, 60%, 80%, and 100%. These densities correspond to a brightness of 255, 204, 153, 102, 51, and 0, respectively, in a case that the pixel value is 256 levels. In the present embodiment, a unit pattern includes six dots, as shown in FIG. 10B. In a case that the density is 0%, no dot is formed. In a case that the density becomes 20%, an S size dot is formed for every other dot, so that an average density in a unit pattern is 20%. In a case that the density is 40%, an M size dot is formed at every dot. Similarly, dots are formed so that the average density in a unit pattern becomes a required density.

In the above description, a unit pattern includes six dots. However, the size of a unit pattern is not restricted to six dots. For example, the size of the unit pattern may be increased to increase accuracy of measurement. In addition, a location where a dot is formed may be determined by a binarization process.

The operations are described with reference to FIGS. 5 and 7 again. In step S210, the image-forming device 200 prints the test pattern on a sheet of paper, in accordance with the received data. Since the test pattern is an image for generating a calibration table, no calibration is performed when printing the test pattern. Therefore, the test pattern is printed with the inconsistencies in density remaining.

In step S220, the image scanner 400 reads (or scans) the image of the test pattern. To measure densities for every nozzle in the following process, the resolution for reading the test pattern is higher than that for printing the test pattern. For example, the test pattern is printed by 720 dpi (dot per inch) and is scanned by 2880 dpi. In this case, four data points of density are obtained for a single dot. The image scanner 400 outputs the data to the PC 300. The CPU 310 of the PC 100 stores in HDD 350 the received data as the scanned image 304.

Then, the CPU 310 maps the density data onto the nozzles. For example, the CPU 310 determines a location in the test pattern corresponding to a data point whose density is below a threshold, as the edge of the test pattern. The CPU 310 determines a data point corresponding to the left edge of the test pattern. The CPU 310 determines that four horizontal data points by four vertical data points, in other words, sixteen data points correspond to a left edge pixel (or left edge nozzle).

In step S230, the CPU 310 generates a calibration table on the basis of the scanned image 304. Here, description is given for the nozzles #01 and #02 shown in FIG. 8. In FIG. 8, an area defined by a dashed line shows a printing area corresponding to the nozzle #01. The CPU 310 calculates an average brightness in a unit pattern, on the basis of the scanned image 304. In the following description, in the scanned image 304, a brightness at a data point (x, y) is denoted by C(x, y). It is to be noted that the x-axis and y-axis are defined in the right direction and the downward direction in FIG. 8, respectively.

Here, the coordinates of the left-top data point of a unit pattern is defined as $(x_1, y_1)$. A unit pattern includes six dots, one vertical dot by six horizontal dots. Also, the test pattern is scanned by a linear resolution four times higher than the print linear resolution. Therefore, a unit pattern includes ninety-six data points, four vertical data points by twenty-four horizontal data points. The coordinates of the left-bottom data point, right-top data point, and right bottom data point are $(x_1, y_1+3)$, $(x_1+23, y_1)$, and $(x_1+23, y_1+3)$, respectively. The average density P is calculated by the following equation (1).

$$P = \Sigma C(x,y)/m_D \qquad (1)$$

Here, $m_D$ denotes a number of data points included in a unit pattern. In the present embodiment, $m_D=4\times24=96$. C(x, y) is summed in a range of $x_1 \leq x \leq x_1+23$ and $y_1 \leq y \leq y_1+3$.

Figure 11A:
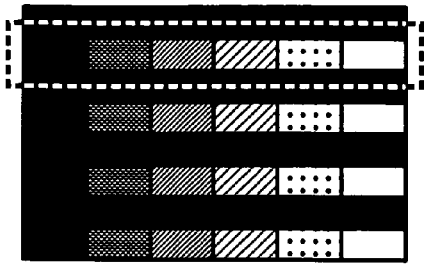
FIGS. 11A and 11B show a method for generating a calibration table for the nozzle #01.
Figure 11B:
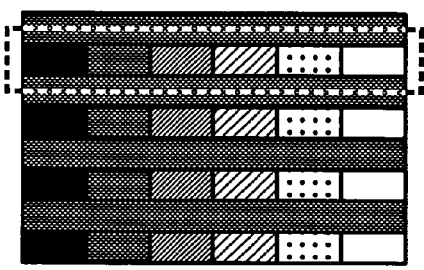

FIGS. 11A and 11B show a method for generating a calibration table for the nozzle #01. The basic pattern shown in FIGS. 11A and 11B are the same as those in FIGS. 9A and 9B. FIG. 11A shows a basic pattern corresponding to a reference brightness that is zero. FIG. 11B shows a basic pattern corresponding to the reference brightness that is 51. First, the CPU 310 calculates the average density (or average brightness) P of each unit pattern for a case that the reference brightness is 0 (zero) (FIG. 11A). In this case, the average densities are calculated as 20, 28, 37, 52, 80, and 89 for unit patterns corresponding to input brightness of 0, 51, 102, 153, 204, and 255, respectively. Then, the CPU 310 calculates the average brightness P of each unit pattern for a case in which the reference brightness is 51 (FIG. 11B). In this case, the average densities are calculated as 27, 34, 54, 74, 83, and 116 for unit patterns corresponding to input brightness of 0, 51, 102, 153, 204, and 255, respectively. Similarly, the calculation is performed for cases in which the reference brightness is 102, 153, 204, and 255. The CPU 310 stores the calculated average brightness in RAM 330.

Figure 12A:
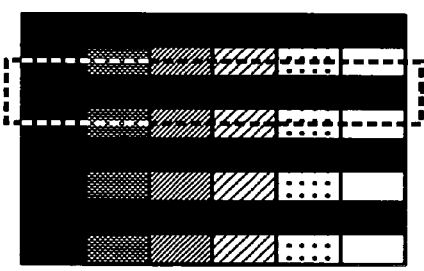
FIGS. 12A and 12B show a method for generating a calibration table for the nozzle #02.
Figure 12B:
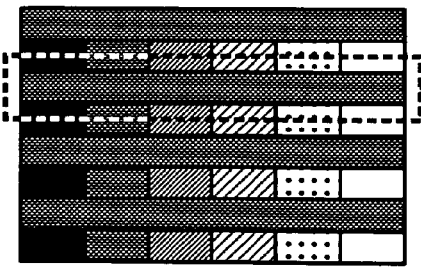

FIGS. 12A and 12B show a method for generating a calibration table for the nozzle #02. The basic pattern shown in FIGS. 12A and 12B are the same as those in FIGS. 9A and 9B. First, the CPU 310 calculates the average brightness P of each unit pattern for a case in which the brightness of the target nozzle is 0 (zero) (FIG. 12A). It is to be noted that, for the nozzles #00, #02, #04, and #06, the brightness of the target nozzle is constant and the reference brightness varies. In other words, for the nozzles having an odd identification number, the reference brightness is constant and the brightness of the target nozzle varies. For the nozzles having an even identification number, the reference brightness is constant and the brightness of the target nozzle varies. In this case, the average densities are calculated as 19, 26, 29, 41, 55, and 77 for unit patterns corresponding to the reference brightness of 0, 51, 102, 153, 204, and 255, respectively. Then, the CPU 310 calculates the average brightness P of each unit pattern for a case in which the brightness of the target nozzle is 51 (FIG. 12B). In this case, the average densities are calculated as 25, 31, 40, 56, 74, and 97 for unit patterns corresponding to the reference brightness of 0, 51, 102, 153, 204, and 255, respectively. Similarly, the calculation is performed for cases that the brightness of the target nozzle is 102, 153, 204, and 255. The CPU 310 stores the calculated average brightness in the RAM 330.

Similar to the above case, the CPU 310 calculates the average brightness P of each unit pattern for all the nozzles #00-#07. The calculated results are stored in RAM 330. The CPU 310 generates a calibration table on the basis of the average brightness stored in RAM 330. The CPU 310 stores in RAM 330 the generated table as the calibration table TB1. The CPU 310 transmits to the image-forming device 200 a request for updating the calibration table. The calibration table is transmitted with the request to the image-forming device 200. When the image-forming device 200 receives the request, the CPU 210 stores in ROM 220 the received calibration table TB1. Thus, the image-forming device 200 stores the calibration table TB1, which is unique to the image-forming device 200.

FIG. 13 shows an example of a part of the calibration table TB1. The calibration table TB1 includes a plurality of sub-tables, each of which corresponds to a nozzle. In this case, the calibration table TB1 includes eight sub-tables for the nozzles #00-#07. In FIG. 13, the sub-tables for the nozzles #00-#02 are shown. In the table, a column corresponds to an input brightness of the target nozzle and a row corresponds to an input brightness of the reference nozzle (or the reference brightness). In the table, a cell shows an output brightness (or average brightness) corresponding to a brightness of a target nozzle and a reference nozzle. For example, in a case that the input brightness of the target nozzle is 51 and the input brightness of the reference nozzle is 102, the output brightness for the nozzle #00 is 45.

Here, a parameter MaxMin is introduced. The parameter MaxMin shows the lowest values within the highest brightness (in the example shown in FIG. 13, the brightness corresponding to the input brightness 255 of the target nozzle and the input brightness 255 of the reference nozzle) at each nozzle. In the example shown in FIG. 13, MaxMin=241 is obtained. Also, a parameter MinMax is introduced. The parameter MinMax shows the highest values within the lowest brightness (in the example shown in FIG. 13, the brightness corresponding to the brightness 0 of the target nozzle and the brightness 0 of the reference nozzle) at each nozzle. In the example shown in FIG. 13, MinMax=23 is obtained. The brightness C available for the image-forming device 200 is restricted to the range as MinMax≦C≦Max min. In this case, the brightness C is restricted to the range of 23≦C≦241.

Similarly to black, calibration tables for cyan, yellow, and magenta are generated.

1-3. Calibration

Then, the description will be given for calibration using the calibration table TB1 generated as described above. In this section, a detailed description of the calibration in step S130 in FIG. 4 will be given. It is to be noted that the description will be given for an example of black ink, the calibration is performed for other color components, for example, cyan, yellow, and magenta.

Figure 14:
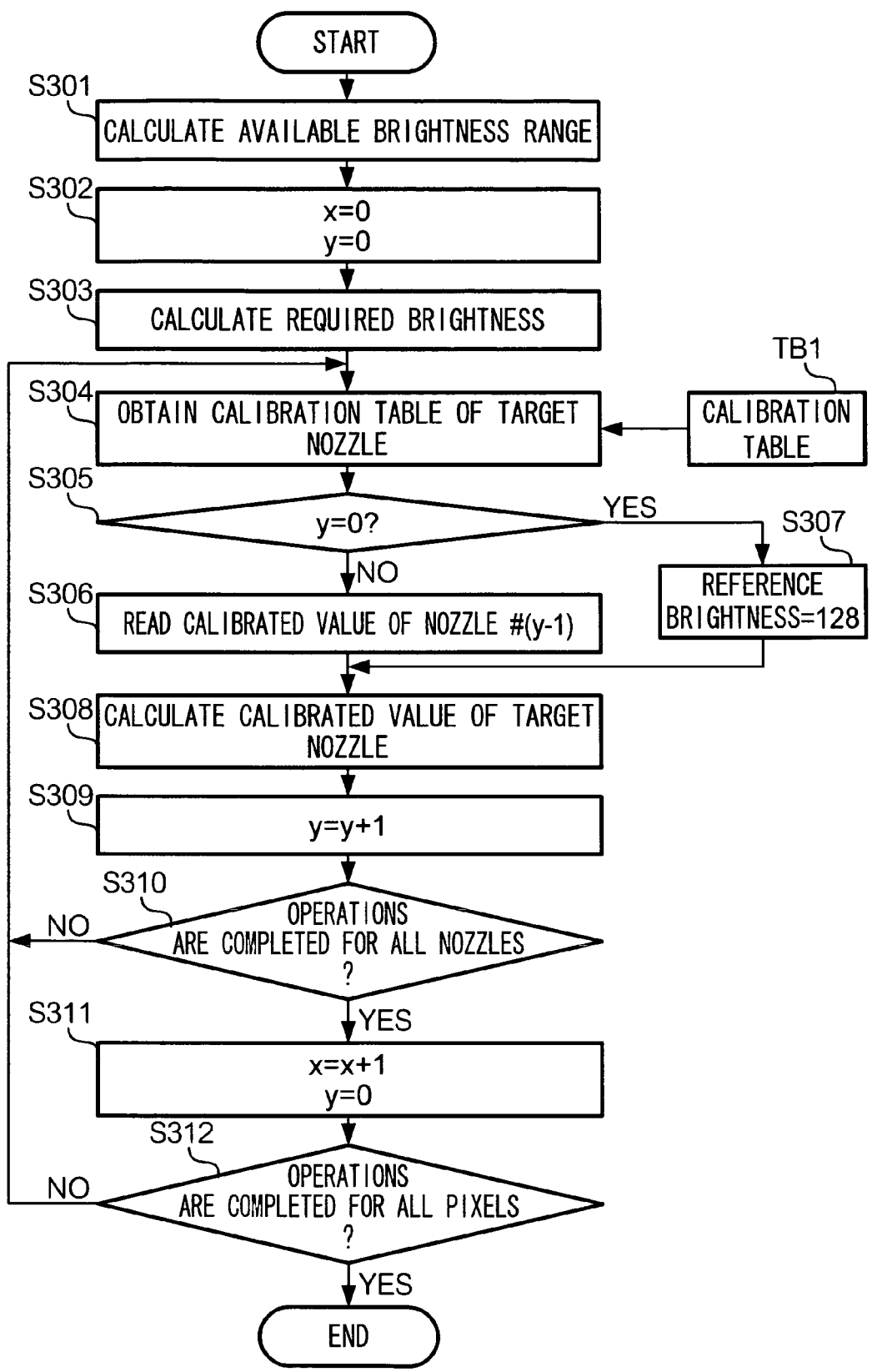
FIG. 14 is a flowchart illustrating operations in calibration.

FIG. 14 is a flowchart illustrating operations in calibration in accordance with the present embodiment. In step S301, the CPU 110 of the PC 100 calculates the available brightness range of the nozzles. In other words, the CPU 110 calculates the parameters MaxMin and MinMax on the basis of the calibration table TB1. To simplify the description, a description will be given for only three nozzles, the nozzles #00-#02. The calibration table for the nozzles #00-#02 is shown in FIG. 13. As shown in FIG. 13, the CPU 110 calculates the parameters as MaxMin=241 and MinMax=23.

In step S302, the CPU 110 initializes the parameters x and y, that show a position in the image. The parameter x shows horizontal position (or width directional position of a pixel) in the image. The parameter y shows vertical position (or height directional position of a pixel) in the image. In other words, the parameter y corresponds to the identifier of the nozzles. In the present embodiment, the CPU 110 initializes the parameters as x=0 and y=0.

In step S303, the CPU 110 calculates a required brightness. The "required brightness" means desired value of the output brightness. In the present embodiment, the input image is represented with 256-level brightness. However, the available brightness C in the image-forming device 200 is restricted as MinMax≦C≦Max min, specifically, 23≦C≦241 in the present embodiment. Therefore, it is required to convert the range of the input brightness into the range of the available brightness. The required brightness is the brightness after converting the input brightness. Concretely, the required brightness $C_{req}$ is calculated on the basis of the input brightness I, in accordance with the following equation (2). In the equation (2), $C_{max}$ shows the maximum value of the brightness (in this case, $C_{max}$=255).

$$C_{req}=(MaxMin-MinMax)/C_{max} \times I + MinMax \qquad (2)$$

Here, the description will be given for an example in which the brightness of the input image is constant at 128 for all pixels. In this case, $C_{req}$=132 is obtained by substituting MaxMin=241, MinMax=23, $C_{max}$=255, and I=128 into the equation (2). In this case, the required brightness is constant at 132 for all pixels because the brightness of the input image is constant for all pixels.

Figure 15:
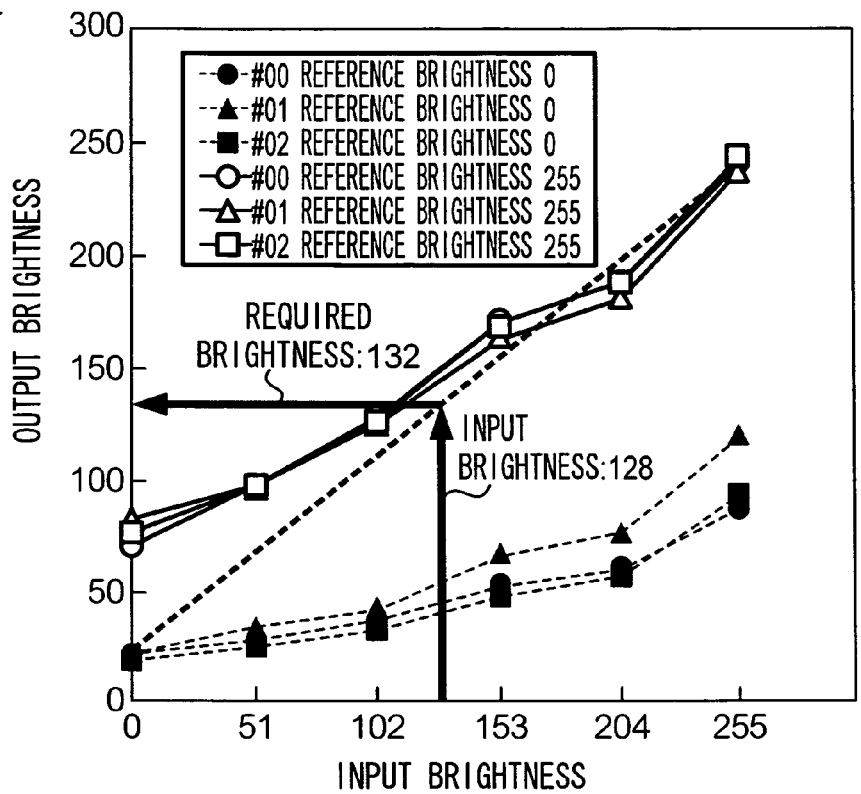
FIG. 15 shows a relationship between the output brightness and the input brightness.

FIG. 15 shows a relationship between the output brightness and the input brightness. In FIG. 15, the dashed line shows a line in accordance with the equation (2).

Referring to FIG. 14 again, in step S304, the CPU 110 obtains the calibration table of a target nozzle. The target nozzle corresponds to the parameter y. The operation is carried out, for example, as follows. The CPU 110 transmits to the image-forming device 200 a request for transmitting a calibration table. When receiving the request, the CPU 210 of the image-forming device 200 reads the calibration table TB1 from the ROM 220. The CPU 210 transmits to the source of the request, the PC 100, a response including the calibration table TB1. When receiving the response, the CPU 110 of the PC 100 extracts the calibration table TB1 from the received response. The CPU 110 stores in HDD 150 the calibration table TB1. The CPU 110 extracts from the calibration table TB1 a sub-table corresponding to the nozzle #y. The CPU 110 stores the sub-table in RAM 130.

It is to be noted that the PC 100 may obtain the calibration table TB1 from the image-forming device 200 before the flow shown in FIG. 14, for example, when installing a printer driver in the PC 100.

In step S305, the CPU 110 determines whether the parameter y satisfies y=0, in other words, the CPU 110 determines whether the target nozzle corresponds to an edge of the image. When the parameter y satisfies y=0 (S305: YES), in step S307, the CPU 110 determines the reference brightness as a predetermined value, 128 in this case. If the target nozzle is located at the edge of the line head, the adjacent nozzle of the target nozzle does not exist, in other words, the reference nozzle does not exist. Thus, the reference brightness is given automatically. In step S308, the CPU 110 calculates a calibrated value of the target nozzle on the basis of the calibration table, the reference brightness, and the required brightness. The operation for calculating the calibrated value will be described in detail later. The CPU 110 stores in RAM 130 the calculation result, the calibrated value.

When the parameter y satisfies y=1, in other words, the parameter y does not satisfy y=0 (S305: NO), in step S306, the CPU 110 reads from the RAM 130 the calibrated value of the nozzle #(y−1). In step S308, the CPU 110 calculates a calibrated value of the target nozzle on the basis of the calibration table, the reference brightness, and the required brightness. The CPU 110 stores in RAM 130 the calculation result, the calibrated value.

The calculation of the calibrated value in step S308 is carried out as follows.

Figure 16:
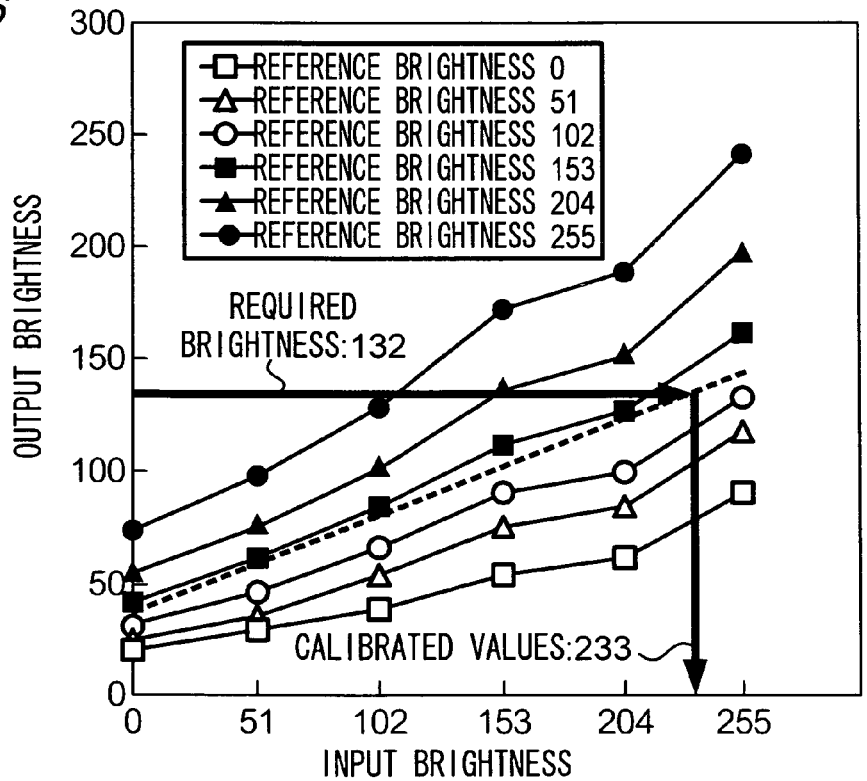
FIG. 16 shows a relationship between the output brightness and the input brightness of the nozzle #00 shown in FIG. 13.

FIG. 16 shows a relationship between the output brightness and the input brightness of the nozzle #00 shown in FIG. 13. As shown in FIG. 16, the calibration table shows input output characteristics of a target nozzle with a certain reference brightness. As described above, when the target nozzle is the nozzle #00, the reference brightness is determined as a predetermined value, 128 in this case.

In the present embodiment, the calibration table includes a plurality of (six, in this case) data set, each of which corresponds to reference brightness of 0, 51, 102, 153, 204, and 255, respectively. If the reference brightness has a value other than these values, it is required to calculate the calibrated value by interpolation. In this case, because the reference brightness is 128, the calibrated value is calculated by linear interpolation using data sets corresponding to the reference brightness of 102 and 153.

Figure 17A:
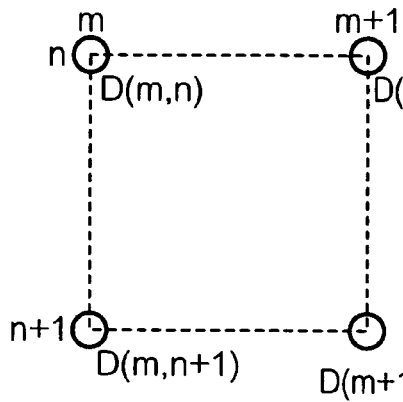
FIGS. 17A-17C illustrate a method of the linear interpolation.
Figure 17B:
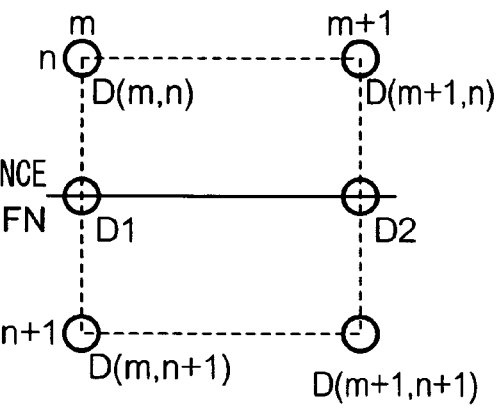
Figure 17C:
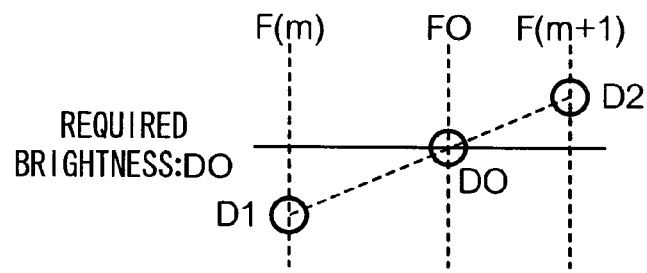

FIGS. 17A-17C illustrate a method of the linear interpolation. First, the CPU 110 determines four data points that are used for the linear interpolation. The four data points are selected from the calibration table. The brightness below and above the reference brightness of 128, in other words, the data points corresponding to a brightness of 102 and 153, are used. Furthermore, the CPU 110 determines four data points from the lines corresponding to a brightness of 102 and 153. The four data points enclose the point having a brightness of 128. In the present embodiment, four data points included in cells shown by a bold line in FIG. 13 are determined to be used. These data points correspond to D(m, n), D(m+1, n), D(m, n+1), and D(m+1, n+1) in FIG. 17A. In this case, D(m, n)=98, D(m+1, n)=133, D(m, n+1)=124, and D(m+1, n+1)=161. Here, the symbol D(m, n) means a density corresponding to the target nozzle corresponding to a parameter m and the reference nozzle corresponding to a parameter n. The parameters m and n relate to one of the data sets included in the calibration table. For example, m=1, 2, . . . , and 6 correspond to the brightness of 0, 51, 102, 153, 204, and 255, respectively.

Then, the CPU 110 calculates interpolated values D1 and D2 by linear interpolation using the brightness FN of the reference nozzle (FIG. 17B). In this case, FN=128, D1=111, and D2=147. The CPU 110 calculates an equation showing a linear line including points D1 and D2. The CPU 110 substitutes the required brightness DO into the equation, thereby calculating a calibrated value FO (FIG. 17C). In this case, DO and FO are calculated as DO=132 and FO=233. In FIG. 16, the dashed line shows input output characteristics corresponding to the reference brightness of 128, obtained by the linear interpolation.

The method of the interpolation is not restricted to the linear interpolation described above.

Figure 18:
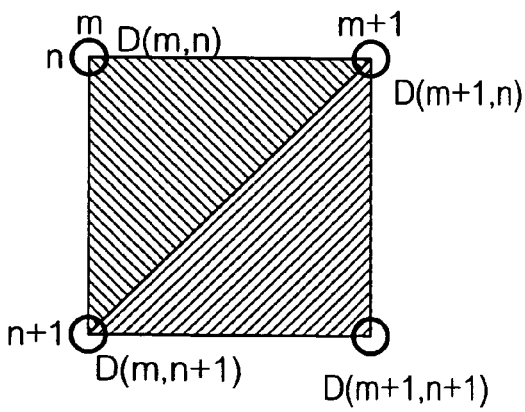
FIG. 18 illustrates a method of planar interpolation.
Figure 19:
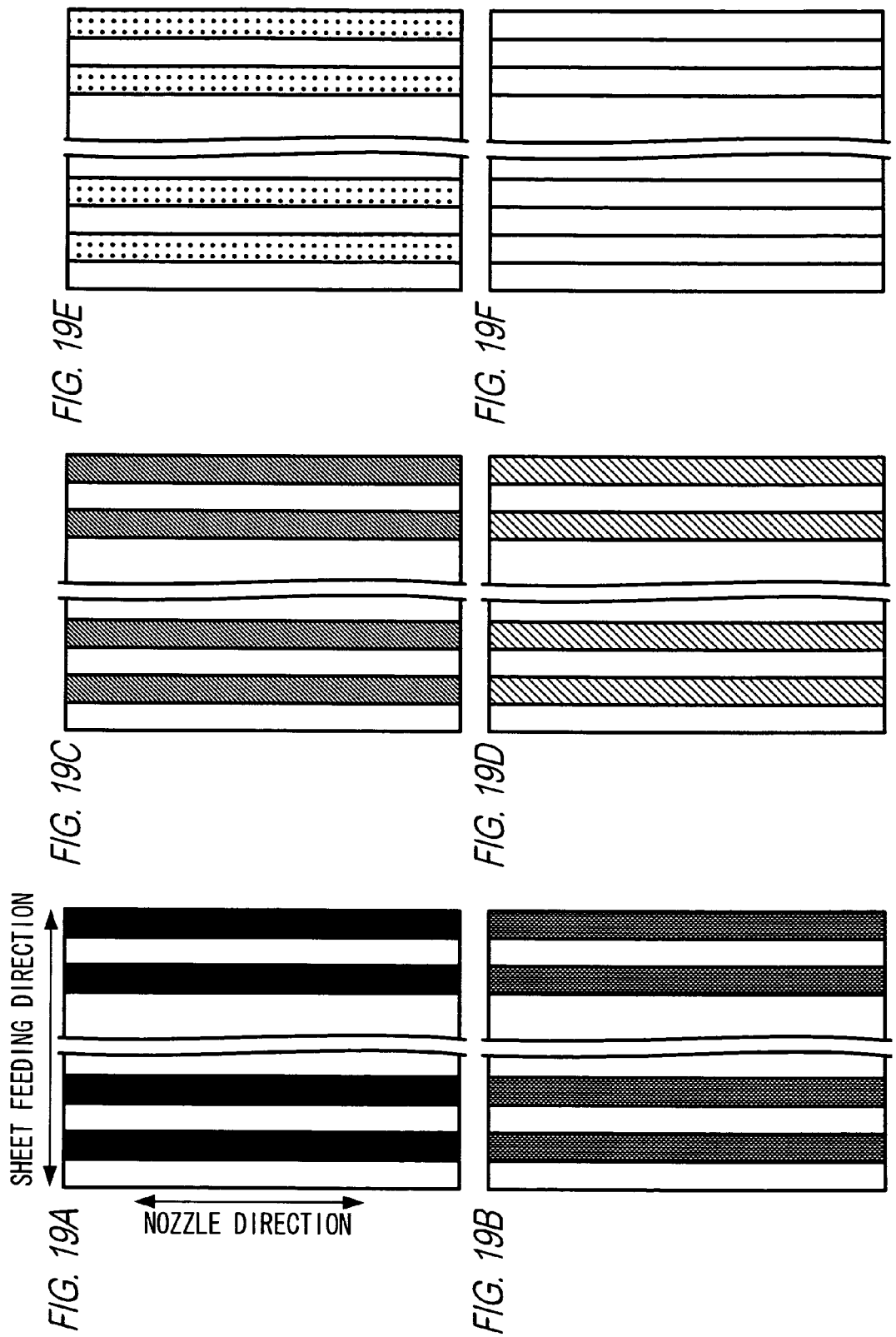
FIGS. 19A-19F show examples of a part of the test pattern 311.

FIG. 18 illustrates a method of planar interpolation. The CPU 110 calculates an equation showing a plane including points D(m, n), D(m+1, n) and D(m, n+1). Furthermore, the CPU 110 calculates another equation showing another plane including points D(m+1, n), D(m, n+1), and D(m+1, n+1). Then, the CPU 110 determines which one of the planes is appropriate on the basis of the reference brightness and the required brightness. The CPU 110 calculates the calibrated value FO by using the equation of the appropriate plane.

As described above, the CPU 110 can calculate the calibrated value by using the linear interpolation.

Referring to FIG. 14 again, in step S309, the CPU 110 updates the identifier showing the target nozzle. Concretely, the CPU 110 updates the parameter y as y=y+1. In step S310, the CPU 110 determines whether the operations are completed for all the nozzles. When the operations are not completed for all nozzles (step S309: NO), the CPU 110 repeats the operations in steps S304-S309. In the present embodiment, when the operations in steps S304-S309 are carried out for the nozzle #00, the operations in steps S304-S309 are carried out for the nozzle #01.

The operations in steps S304-S309 for the nozzle #01 are almost the same as those for the nozzle #00. The difference between the nozzle #01 and the nozzle #00 are as follows. In this case, because the target nozzle is the nozzle #01, the determination result in step S305 is NO. Therefore, the CPU 110 proceeds to the operation in step S306. In step S306, the CPU 110 reads from the RAM 130 the calibrated value of the nozzle #(y−1), in this case the nozzle #00, as the reference brightness. The other operations in steps S308-S312 are carried out similarly to the operations for the nozzle #00. The operations for the nozzle #02 and the following nozzles are carried out similarly to the above description.

When the operations are completed for all nozzles (step S310: YES), in step S311, the CPU 110 updates the parameters x and y as x=x+1 and y=0. In step S312, the CPU 110 determines whether the operations are completed for all pixels, in other words, the CPU 110 determines whether the parameter x satisfies a condition, $x=x_{max}$. Here, $x_{max}$ corresponds to the width of the image. When the CPU 110 determines that the operations are not completed for all pixels (S312: NO), the CPU 110 repeats the operations in steps S304-S311. When the CPU 110 determines that the operations are completed for all pixels (S312: YES), the CPU 110 terminates the calibration process.

As described above, the calibration generating system can generate a calibration table including data set showing the effects of the adjacent nozzles. In addition, the image-forming system can prevent degradation in image quality caused by the dispersion in the physical characteristics of the nozzles. Thus, a user can obtain an image having a higher image quality.

It is to be noted that the calibration table shown in FIG. 13 is merely an example, and the format and contents of the calibration table are not restricted to FIG. 13. For example, although the calibration table TB1 includes six data sets, each of which corresponding to a certain reference brightness, the number of data sets is not restricted to six. To increase the accuracy in interpolation, the number of data sets may be increased. Alternatively, to decrease storage area used for the calibration table, the number of data sets may be decreased.

Although the image-forming device 200 is a line head printer in the above described embodiment, the image-forming device 200 may be another kind of printer, for example, a two-pass printer. In addition, although the color system used in the image-forming device 200 includes four color components, the image-forming device 200 may use another color system, for example, one including six or seven color components.

In the above described embodiment, the operations shown in FIG. 14 are carried out by the PC 100. All or a part of the operations in steps S100-S150 may be carried out by the image-forming device 200. In a case that the image-forming device 200 carries out all of the operations in steps S100-S150, the image-forming device 200 may have a memory card interface for reading data from a memory card. A user can insert a memory card into the memory card interface. The image-forming device 200 reads image data from the memory card via the memory card interface, and carries out the operations shown in FIG. 4.

It is to be noted that the positional relationship between the target pixel and the reference pixel is not restricted to the above description. The reference pixel is a pixel that has a predetermined positional relationship to the target pixel. The reference pixel is a pixel other than the target pixel. Any kind of a relationship may be employed as the predetermined positional relationship.

2. Second Embodiment

The second embodiment of the invention will be described in this section. In the following, the difference between the first embodiment and the second embodiment will be mainly described. The common elements with the first embodiment will be referred to with the common reference numerals.

In the first embodiment, the reference pixel is formed by a nozzle adjacent to the target nozzle that forms the target pixel. In the present embodiment, the reference pixel is formed by the same nozzle as the nozzle that forms the target nozzle. Furthermore, the reference pixel is a pixel adjacent to the target pixel. In other words, the image-forming system 1 of the present embodiment uses not the calibration table TB1 but the calibration table TB2. The calibration table TB2 includes data sets showing the effects of the adjacent line. Concretely, the calibration table generating system 2 of the present embodiment uses a test pattern 311 for generating the calibration table TB2, instead of the test pattern 301 used in the first embodiment.

FIGS. 19A-19F show examples of a part of the test pattern 311. The test pattern 311 is based on a pattern generated by rotating the test pattern shown in FIG. 9. In FIG. 19, the nozzles are laid out vertically, and the sheet is fed horizontally. In the test pattern 311, a unit pattern includes a plurality of dots corresponding to the number of the nozzles. The test pattern 311 includes a zebra pattern. The test pattern includes l-lines. Line identifier is introduced so that a line #00 denotes the left most line of the pattern, a line #01 denotes the second left most line, and so on.

In a basic pattern shown in FIG. 19A, the brightness of the line #($2k$+1) (or odd line) is 0 (zero). The brightness of the line #($2k$) (or even line) is 255. Here, $k$=0, 1, 2, 3, . . . . As shown in FIGS. 19A-10F, to obtain six data sets for a line, thirty-six (=6×6) basic patterns are necessary. Each data set corresponds to a certain brightness. FIGS. 19A-19F shows only six basic patterns, corresponding to the even line having brightness of 255. In general, to obtain c data sets for a line, $c^2$ (=c×c) basic patterns are necessary.

Figure 20:
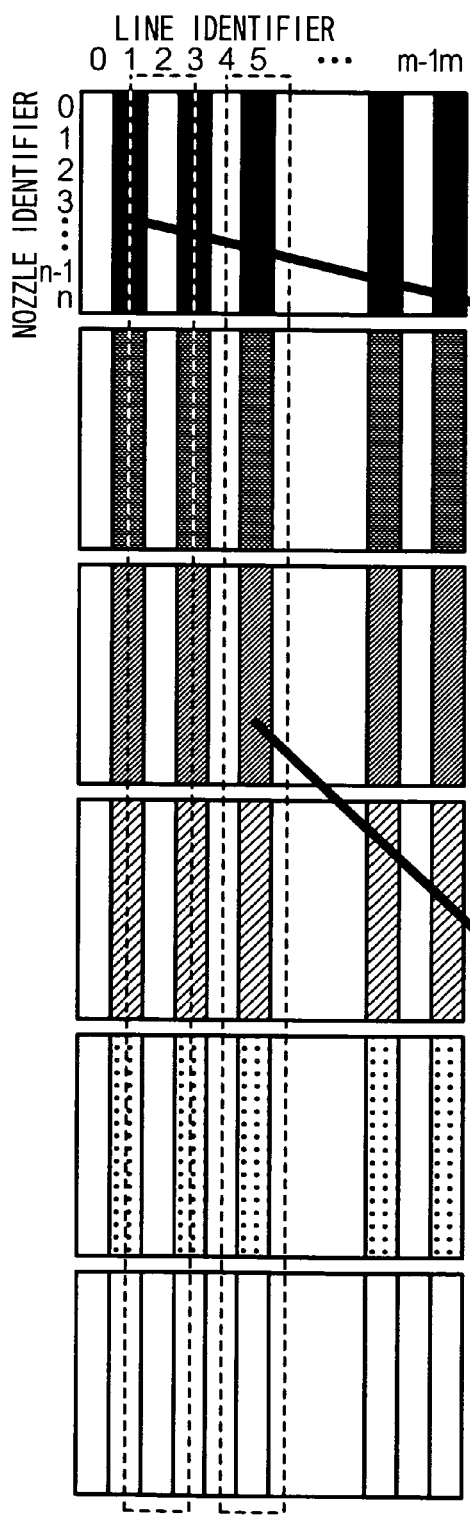
FIG. 20 shows a method for generating calibration table TB2.
Figure 21D:
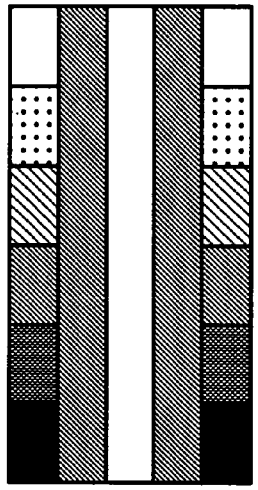
FIGS. 21A-21F show examples of a part of the test pattern 321.
Figure 21E:
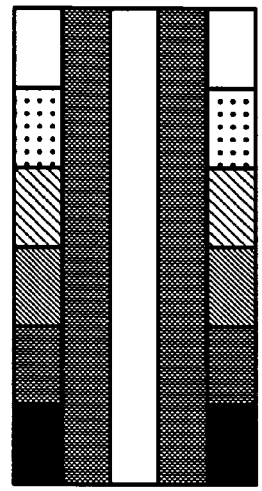
Figure 21F:
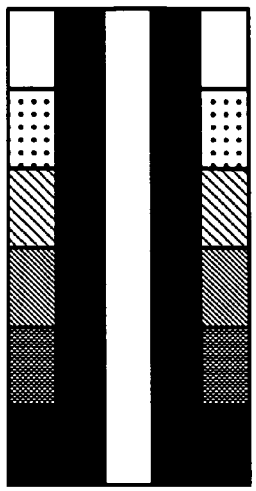
Figure 21A:
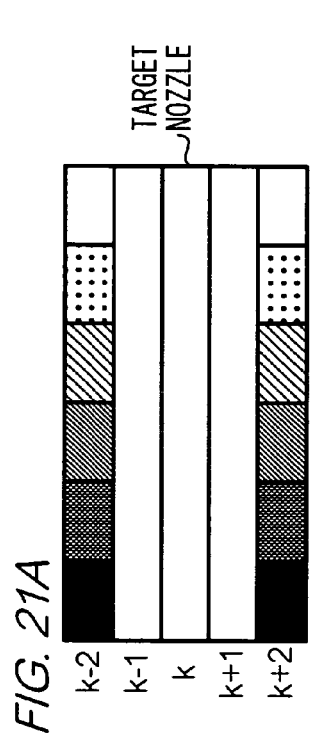
Figure 21B:
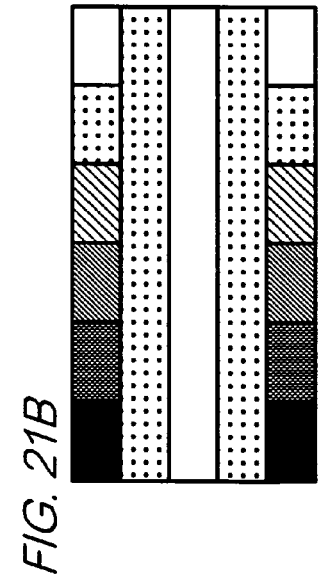
Figure 21C:
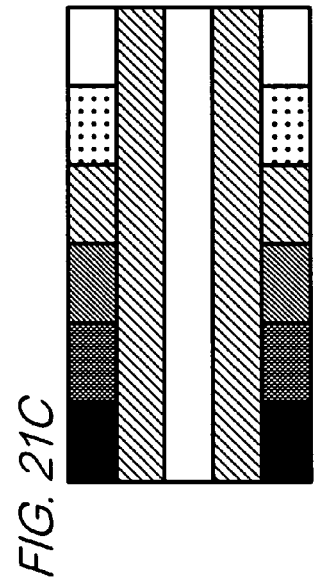
Figure 22A:
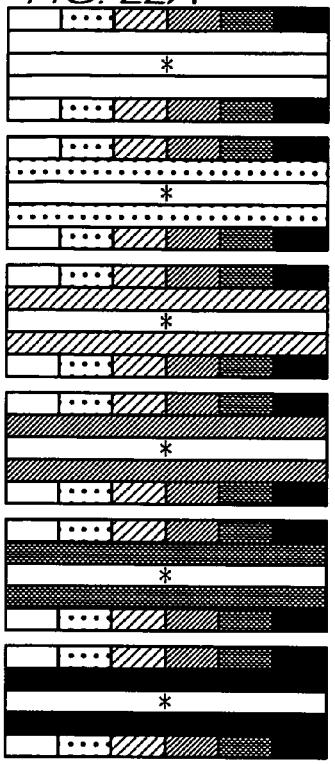
FIGS. 22A-22F show examples of a part of test pattern 321.
Figure 22B:
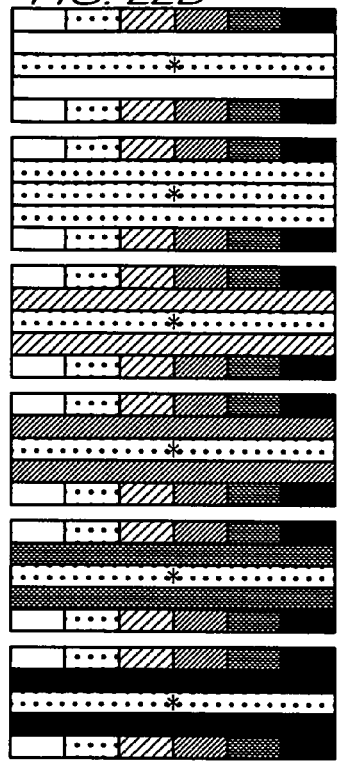
Figure 22C:
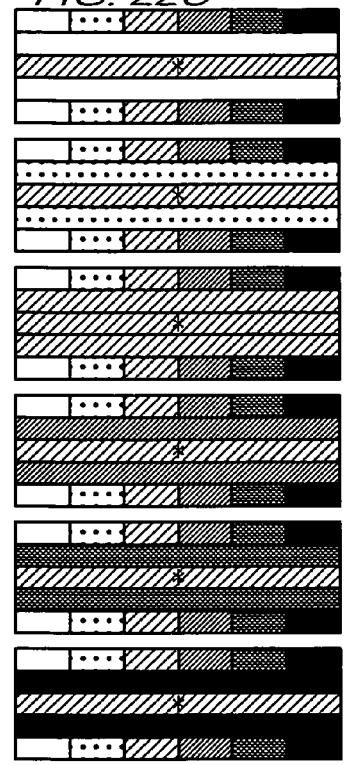
Figure 22D:
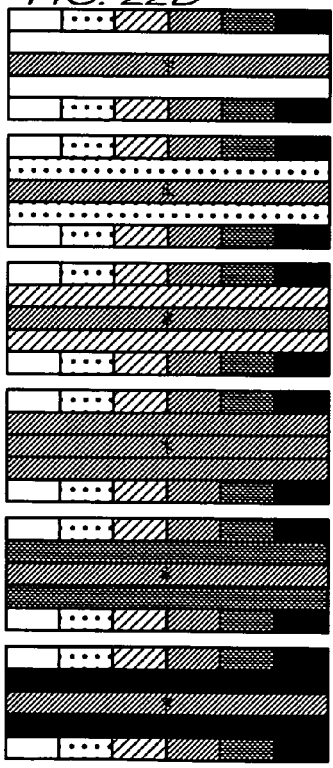
Figure 22E:
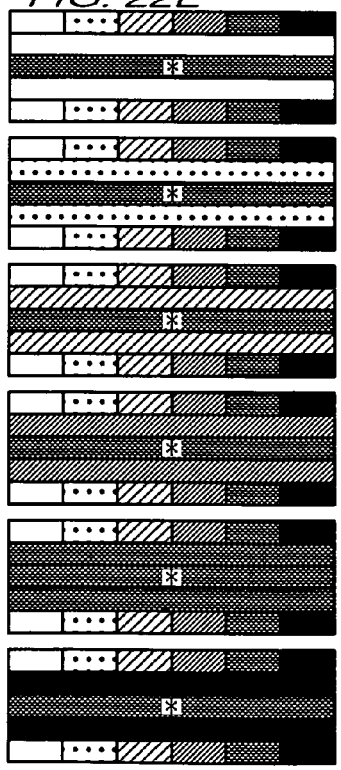
Figure 22F:
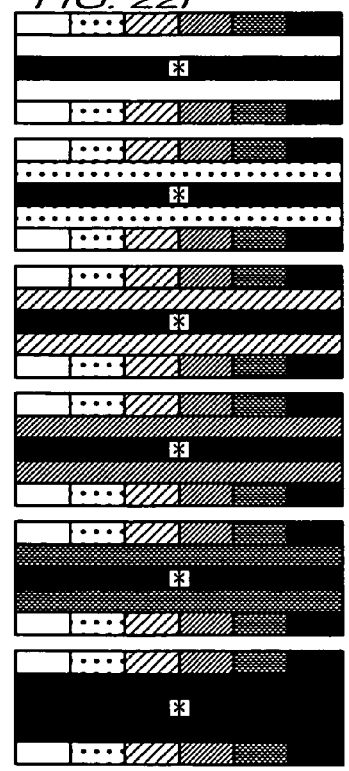

FIG. 20 shows a method for generating calibration table TB2. The description will be given for an example in which an even line (the line #02, for example) is the target line. The target line is a line that is an object of the operation. In the test pattern shown in FIGS. 19A-19F, the brightness of the target line is constant at 255. The brightness of the reference line varies as 0, 51, 102, 153, 204, and 255. The reference line is a line including a target pixel. The CPU 310 of the PC 300 calculates the average brightness similarly to the first embodiment, and stores in the RAM 330 the calculated average brightness.

Then, the description will be given for an example in which an odd line (the line #05, for example) is the target line. In the test pattern shown in FIGS. 19A-19F, the brightness of the target line varies as 0, 51, 102, 153, 204, and 255. The brightness of the reference line is constant at 255. The CPU 310 of the PC 300 calculates the average brightness similarly to the first embodiment, and stores in the RAM 330 the calculated average brightness.

The CPU 310 generates the calibration table TB2 on the basis of the average brightness stored in the RAM 330. The image-forming system 1 of the present embodiment uses the calibration table TB2. The details of the calibration are similar to that in the first embodiment, except for substitution of the term "nozzle identifier" with "line identifier". Therefore, description thereof is omitted.

According to the present embodiment, the calibration generating system can generate a calibration table including data set showing the effects of the adjacent lines. In other words, the calibration generating system can generate a calibration table including data set showing the effects of a nozzle in different lines. The effects include both the effect of the dispersion relative to physical characteristics of the nozzles, and the effect of the sheet feeding system. The image-forming system is able to prevent degradation caused by such effects. Thus, a user can obtain an image having a higher image quality.

3. Third Embodiment

The third embodiment of the invention will be described in this section. In the following, the difference between the first embodiment and the present embodiment will be mainly described. Elements common to the first embodiment will be denoted by like reference numerals.

In the first embodiment, the reference pixel is a single pixel formed by a nozzle adjacent to the target nozzle that forms the target pixel. In the present embodiment, the image-forming system uses two reference pixels. The two reference pixels include a pixel adjacent to the reference pixel in the first embodiment as well as the reference pixel in the first embodiment. The reference pixel that is the same as the first embodiment is referred to as a "first reference pixel" and the reference pixel newly introduced in the present embodiment is referred to as a "second reference pixel". In the present embodiment, the calibration table generating system 2 of the present embodiment uses a test pattern 321 for generating a calibration table TB3, instead of the test pattern 301 used in the first embodiment.

FIGS. 21A-21F show examples of a part of the test pattern 321. In the basic patterns shown in FIGS. 21A-21F, the brightness of the target nozzle is constant at 255. In the basic patterns shown in FIGS. 21A-21F, the center, the k-th line of a basic pattern corresponds to the target nozzle. The brightness of the first reference nozzle varies as 255, 204, 153, 102, 51, and 0. The first reference nozzle corresponds to the lines #(k−1) and #(k+1) of a basic pattern. The brightness of the second reference nozzle varies as 0, 51, 102, 153, 204, and 255. The second reference nozzle corresponds to the lines #(k−2) and #(k+2) of a basic pattern.

In this case, to obtain six data sets for a nozzle, one-hundred and eighty (=6×6×5) basic patterns are necessary. This is because in the basic patterns shown in FIGS. 21A-21F, the brightness of the target nozzle is constant. To obtain six data sets of a target nozzle, five groups of basic patterns are necessary as well as a group of basic patterns in FIGS. 21A-21F. Each group corresponds to different brightness of the target nozzle. Furthermore, according to the group of basic patterns in FIGS. 21A-21F, the system can obtain a data set of a target line for one line (or the line #k) of the five lines. Therefore, to obtain data sets for the five lines, four groups of basic patterns is necessary as well as a group of basic patterns in FIGS. 21A-21F. In general, to obtain c data sets for a nozzle, $5c^2$ (=c×c×5) basic patterns are necessary.

FIGS. 22A-22F show examples of a part of test pattern 321. FIGS. 22A-22F include six group of basic patterns, each of which corresponds to different brightness of a target nozzle. In fact, the test pattern 321 includes four more pattern groups as well as the pattern group shown in FIGS. 22A-22F.

Figure 23:
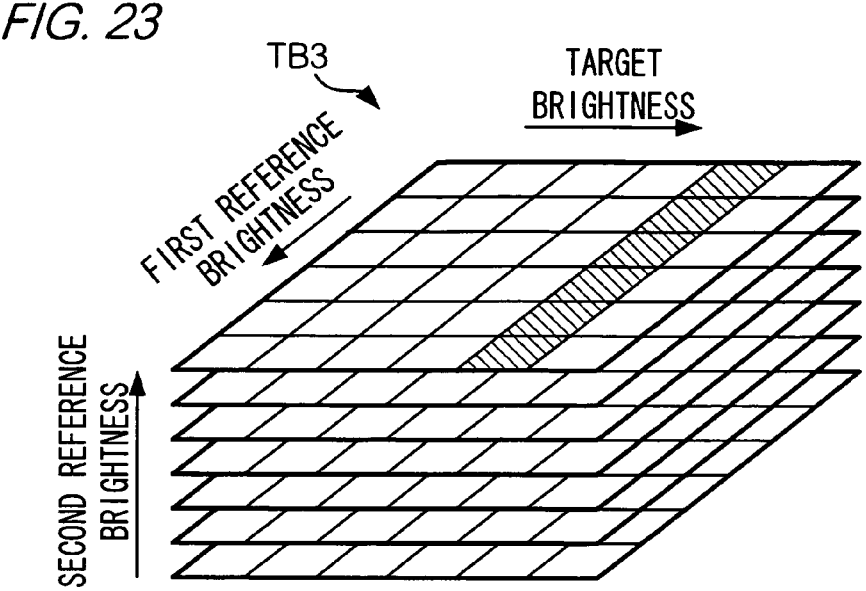
FIG. 23 schematically illustrates a structure of the calibration table TB3.

FIG. 23 schematically illustrates a structure of the calibration table TB3. As shown in FIG. 23, the calibration table TB3 has a three-dimensional structure. The calibration table TB3 includes a plurality of sub-tables. Each of the sub-tables corresponds to a brightness of the second reference nozzle. Each of the sub-tables has a structure similar to that of the calibration table TB1 in the first embodiment. For example, the hatched area in FIG. 23 corresponds to a target nozzle having brightness of 204, a second reference nozzle having brightness of 255, and a first reference nozzle having brightness of 0, 51, 102, 153, 204, and 255.

Calibration process using the calibration table TB3 is basically carried out similarly to the first embodiment. First, when the target nozzle is the nozzle #00, the CPU 110 of the PC 100 determines the values of the first reference nozzle and the second reference nozzle as predetermined values, for example, 128 for both the first and the second reference nozzles. The CPU 110 calculates a calibrated value of the target nozzle by using the calibration table TB3 and the brightness of the first and the second reference nozzles. Then, when the target nozzle is the nozzle #01, the CPU 110 determines the value of the second reference nozzle as predetermined values, for example, 128. Furthermore, the CPU 110 determines the value of the first reference nozzle as the calibrated value of the nozzle #00. The CPU 110 calculates a calibrated value of the target nozzle by using the calibration table TB3 and the brightness of the first and the second reference nozzles. Next, when the target nozzle is the nozzle #02, the CPU 110 determines the value of the second reference nozzle as the calibrated value of the nozzle #00. Furthermore, the CPU 110 determines the value of the first reference nozzle as the calibrated value of the nozzle #01. The CPU 110 calculates a calibrated value of the target nozzle by using the calibration table TB3 and the brightness of the first and the second reference nozzles. The CPU 110 calculates the calibrated values for the nozzle #03 and the following nozzles.

As described above, the calibration table generating system can generate a calibration table including a data set showing the effects of the second reference nozzle as well as the first reference nozzle. The image-forming system can prevent degradation caused by the effects. Thus, a user can obtain an image having a higher image quality.

In the present embodiment, the reference pixel is a pixel formed by a nozzle adjacent to the target nozzle. However, the reference pixel may be a pixel formed by a target nozzle, similarly to the second embodiment. In this case, the calibration table includes a data set showing the effect of the sheet feeding system.

It is to be noted that the positional relationship between the target pixel and the first reference pixel, and a relationship between the target pixel and the second reference pixel, are not restricted to the above description. Also, the number of the reference pixels is not restricted to two. In general, at least one reference pixel may be used for the calibration. Each of at least one reference pixel is a pixel that has a predetermined positional relationship with the target pixel. The reference pixel is a pixel other than the target pixel. Similarly, this may be applied to the first and the second embodiments.

4. Fourth Embodiment

The fourth embodiment of the invention will be described in this section. In the following, the difference between the first embodiment and the present embodiment will be mainly described. The common elements with the first embodiment will be referred with the common reference numerals.

In the first embodiment, the reference pixel is a single pixel formed by a nozzle adjacent to the target nozzle that forms the target pixel. In the second embodiment, the reference pixel is a single pixel formed by the target nozzle. In the present embodiment, the image-forming system uses two reference pixels including a first reference pixel and a second reference pixel. The first reference pixel is the same as the reference pixel in the first embodiment. The second reference pixel is the same as the reference pixel in the second embodiment. In the present embodiment, the first and the second reference pixels are located in a different direction relative to the target pixel. Specifically, a line including the target pixel and the first reference pixel and another line including the target pixel and the second reference pixel are orthogonal.

In the present embodiment, the image-forming system 1 uses two calibration tables, the calibration tables TB1 and TB2 described in the first and the second embodiment. Therefore, in the present embodiment, the calibration table generating system 2 generates the calibration tables TB1 and TB2. The method for generating these tables are described in the first and the second embodiments.

The outline of the calibration in the present embodiment is as follows. In the present embodiment, two calibration tables exist for a single target pixel. The CPU 110 of the PC 100 calculates two calibrated values (referred to as two "provisional calibrated values"). Then, the CPU 110 calculates the average of the two provisional calibrated values. The CPU 110 stores in RAM 130 the average as the finalized calibrated value.

The calibration is carried out, for example, as follows. In a case that the target pixel corresponds to the nozzle #00 and the line #00, the CPU 110 of the PC 100 determines the reference brightness as a predetermined value, for example, 128. The CPU calculates a first provisional calibrated value by using the reference brightness and the calibration table TB1. The first calibrated value is calibrated to prevent effects of the reference nozzle. The CPU 110 stores in the RAM 130 the first calibrated value. Then, the CPU 110 determines the brightness of the reference line as a predetermined value, for example, 128. The CPU 110 calculates a second provisional calibrated value by using the brightness of the reference line and the calibration table TB2. The second provisional calibrated value is calibrated to prevent effects of the reference line. The CPU 110 stores in the RAM 130 the second calibrated value.

Similarly, in a case that the target pixel corresponds to the nozzle #k and the line #1, the CPU 110 calculates a first provisional calibrated value by using the calibration table TB1 and the calibrated value of a pixel corresponding to the nozzle #(k−1) and the line #1. The CPU 110 stores in the RAM 130 the first provisional calibrated value. Then, the CPU 110 calculates a second provisional calibrated value by using the calibration table TB2 and the calibrated value of a pixel corresponding to the nozzle #k and the line #(l−1). The CPU 110 stores in the RAM 130 the second provisional calibrated value. The CPU 110 calculates the average of the first and the second provisional calibrated values. The CPU 110 stores in the RAM 130 the average as a finalized calibrated value of the target pixel.

The image-forming system of the present embodiment can prevent the effects caused by the dispersion of physical characteristics of the nozzle and the sheet feeding system. Thus, a user can obtain an image having a higher image quality.

It is to be noted that the image-forming system may use the calibration table TB3 described in the third embodiment, instead of at least one of the calibration tables TB1 and TB2.

5. Fifth Embodiment

5-1. Image-Forming System

A fifth embodiment of the invention will be described in this section. In the following, the difference between the first embodiment and the present embodiment will be mainly described. The common elements with the first embodiment will be referred with the common reference numerals. In the present embodiment, a test pattern 351 is used instead of the test pattern 301.

Figure 24:
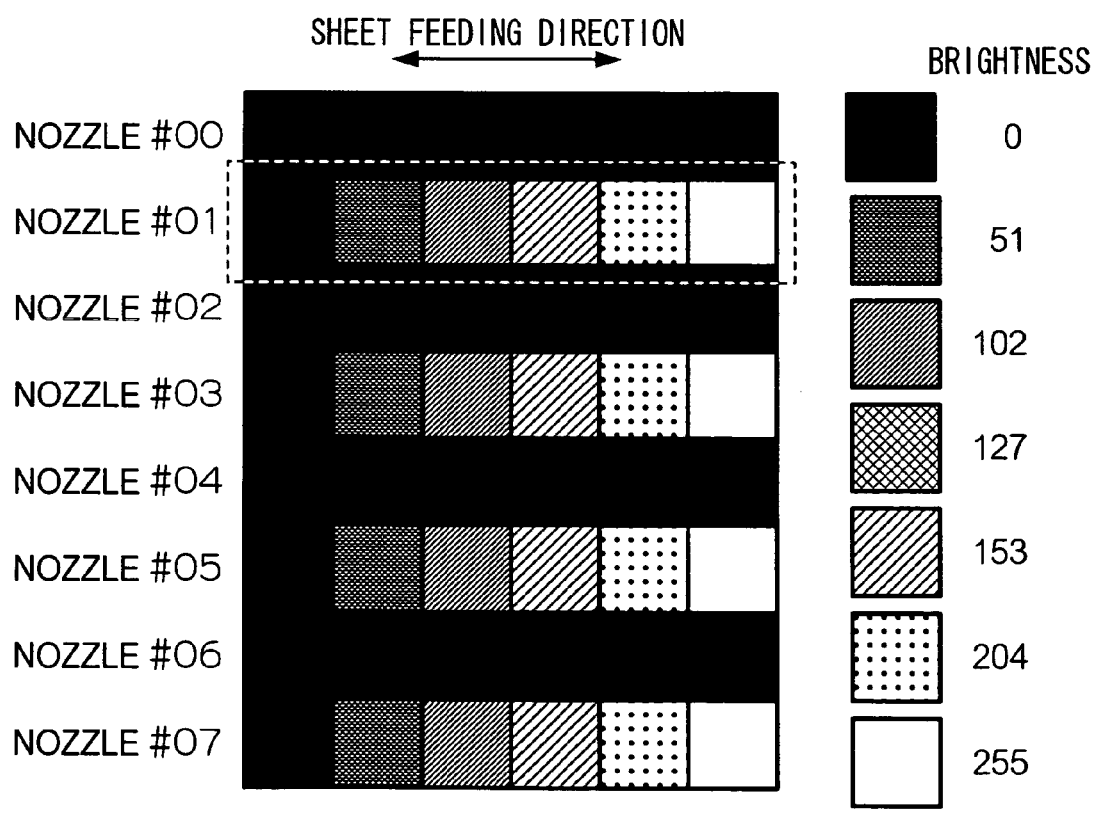
FIG. 24 shows a basic pattern of a test pattern for eight nozzles.

FIGS. 24 and 25 show an example of a part of test pattern 351 in the fifth embodiment. FIG. 24 shows a basic pattern of a test pattern for eight nozzles, which nozzles are referred to respectively as nozzles #00-#07. In FIG. 24, the nozzles are laid-out in a top-bottom direction (vertically), and the print media is fed in a right-left direction (horizontally). In the present embodiment, a calibrated value (correction value) of a target pixel is determined on the basis of pixel values of the target pixel and a reference pixel. The target pixel is a pixel that is an object of processing. The reference pixel is a pixel that is other than the target pixel, and is determined by a predetermined algorithm. In the present embodiment, the reference pixel is a pixel that corresponds to a dot formed by an ink droplet ejected by a nozzle located adjacent to a target nozzle. The target nozzle is a nozzle that ejects an ink droplet to form a dot corresponding to the target pixel. The test pattern 351 is generated in a case that the reference pixel is a pixel that corresponds to a dot formed by an ink droplet ejected by a nozzle located adjacent to a target nozzle. In the present embodiment, the "target nozzle" and the "reference nozzle" correspond to the "target pixel" and the "reference pixel", respectively.

In the example shown in FIG. 24, the basic pattern includes a pattern for the nozzles #00, #02, #04, and #06 whose brightness is constant at 0 (zero). On the contrary, the basic pattern includes a pattern for the nozzles #01, #03, #05, and #07 whose brightness varies, for example, 0, 51, 102, 153, 204, and 255. In other words, the basic pattern for the nozzles #01, #03, #05, and #07 includes a plurality of areas whose brightness is different from each other. In a case that the target nozzle is the nozzle #01, the reference nozzle is the nozzle #00. In other words, the test pattern 351 includes an area for the reference nozzle, in which the brightness is maintained constant at a predetermined value. Furthermore, the test pattern 351 includes a plurality of areas for the target nozzle, in which the brightness is varied.

Figure 25A:
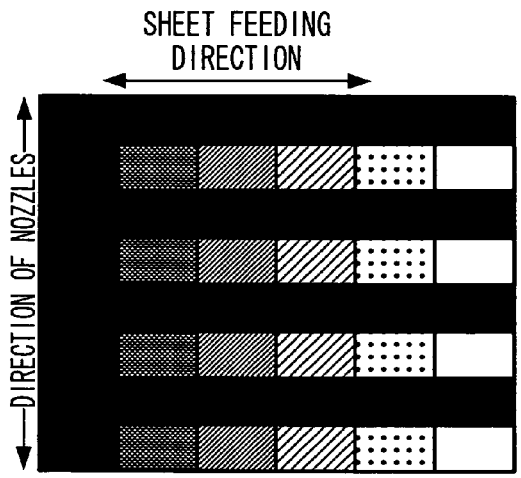
FIGS. 25A-25F show six basic patterns used in the fifth embodiment.
Figure 25D:
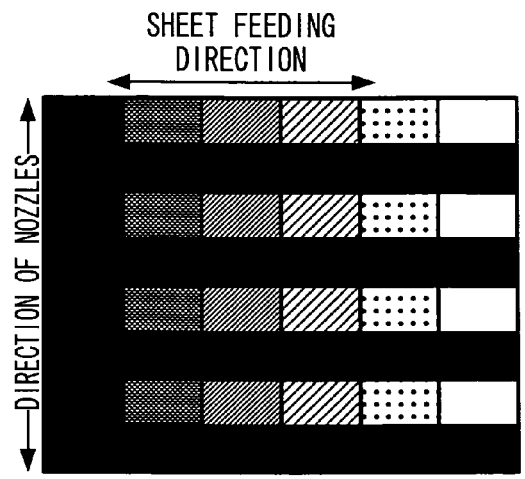
Figure 25B:
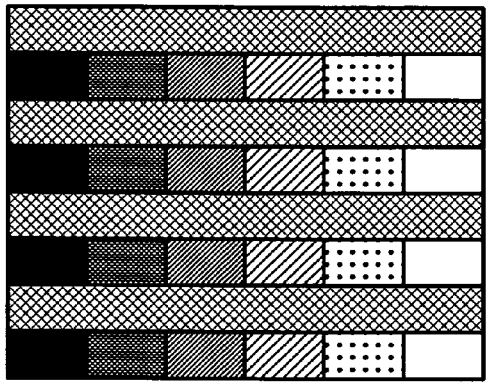
Figure 25E:
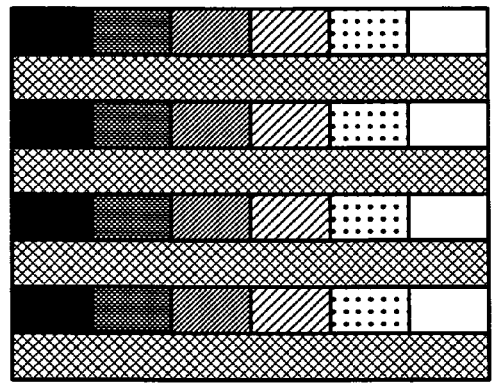
Figure 25C:
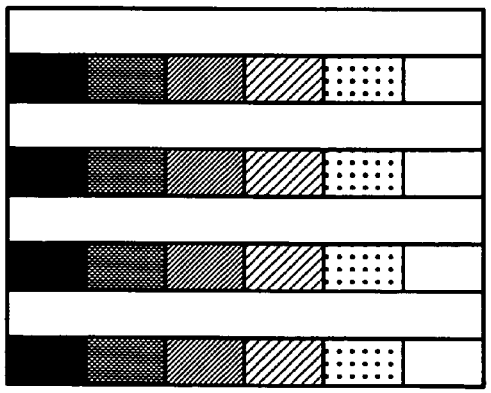
Figure 25F:
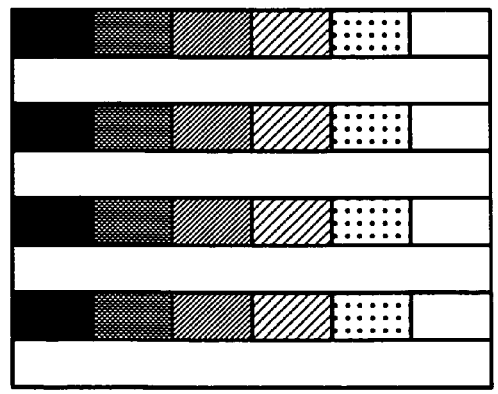

FIGS. 25A-25F show six basic patterns used in the present embodiment. The basic pattern in FIG. 25D is obtained by exchanging the even lines and odd lines in the basic pattern in FIG. 25A. Similarly, the basic patterns in FIGS. 25E and 25F are obtained by exchanging the even lines and odd lines in the basic patterns in FIGS. 25B and 25C, respectively. The basic pattern shown in FIG. 25A is the same as that shown in FIG. 24. In FIGS. 25A-25C, the reference brightness are different. Specifically, the reference brightness is 0, 127, and 255, respectively. By using the basic patterns shown in FIGS. 25A-25F, calibration data is obtained for eighteen (=6×3) combinations, six patterns for the target nozzle by three patterns for the reference nozzle. In general, to obtain calibration data for MN combinations, M patterns for the target nozzle by N patterns for the reference nozzle, 2MN basic patterns are required.

Figure 26A:
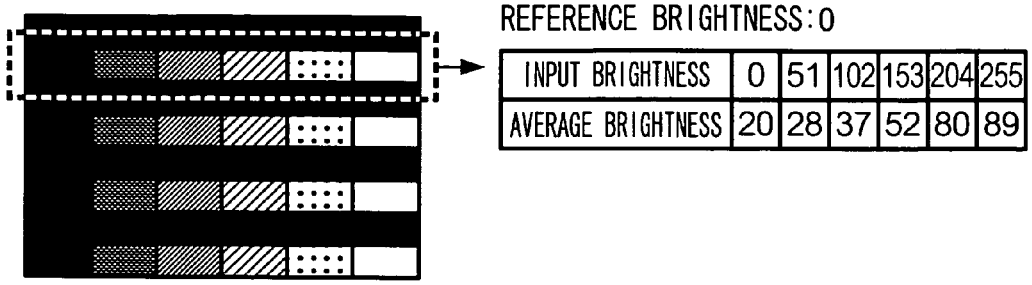
FIGS. 26A and 26B show a method for generating a calibration table for the nozzle #01.
Figure 26B:
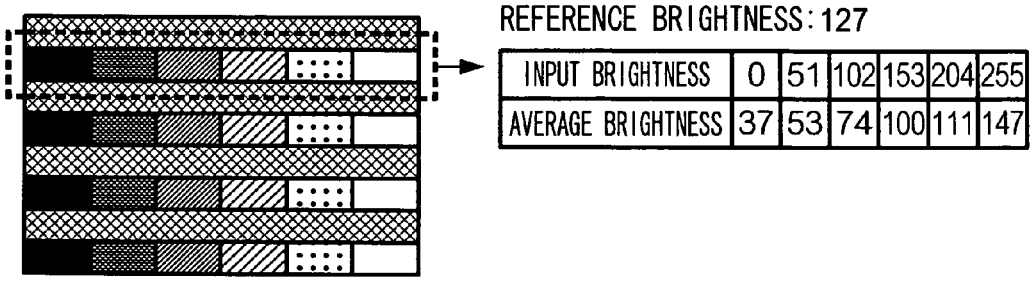

FIGS. 26A and 26B show a method for generating a calibration table for the nozzle #01. The basic pattern shown in FIGS. 26A and 26B are the same as those in FIGS. 25A and 25B. FIG. 26A shows a basic pattern corresponding to a reference brightness that is zero. FIG. 26B shows a basic pattern corresponding to the reference brightness that is 127. First, the CPU 310 calculates the average density (or average brightness) P of each unit pattern for a case that the reference brightness is 0 (zero) (FIG. 26A). In this case, the average densities are calculated as 20, 28, 37, 52, 80, and 89 for unit patterns corresponding to input brightness of 0, 51, 102, 153, 204, and 255, respectively. Then, the CPU 310 calculates the average brightness P of each unit pattern for a case in which the reference brightness is 127 (FIG. 26B). In this case, the average densities are calculated as 37, 53, 74, 100, 111, and 147 for unit patterns. Similarly, the calculation is performed for cases in which the reference brightness is 255. The CPU 310 stores the calculated average brightness in RAM 330.

Then, CPU 310 calculates average densities for the unit patterns for the nozzle #02. For the nozzles having even identification number, the basic pattern in FIGS. 25D-25F are used. The CPU 310 stores in the RAM 330 the calculated average.

Similar to the above case, the CPU 310 calculates the average brightness P of each unit pattern for all the nozzles #00-#07. The calculated results are stored in RAM 330. The CPU 310 generates a calibration table on the basis of the average brightness stored in RAM 330. The CPU 310 stores in RAM 330 the generated table as the calibration table TB1. The CPU 310 transmits to the image-forming device 200 a request for updating the calibration table. The calibration table is transmitted with the request to the image-forming device 200. When the image-forming device 200 receives the request, the CPU 210 stores in ROM 220 the received calibration table TB1. Thus, the image-forming device 200 stores the calibration table TB1, which is unique to the image-forming device 200.

FIG. 27 shows an example of a part of the calibration table TB4. The calibration table TB4 includes a plurality of sub-tables, each of which corresponds to a nozzle. In this case, the calibration table TB4 includes eight sub-tables for the nozzles #00-#07. In FIG. 27, the sub-tables for the nozzles #00-#02 are shown. In the table, a column corresponds to an input brightness of the target nozzle and a row corresponds to an input brightness of the reference nozzle (or the reference brightness). In the table, a cell shows an output brightness (or average brightness) corresponding to a brightness of a target nozzle and a reference nozzle. For example, in a case that the input brightness of the target nozzle is 51 and the input brightness of the reference nozzle is 127, the output brightness for the nozzle #00 is 53.

5-3. Calibration

Then, the description will be given for calibration using the calibration table TB4 generated as described above. In this section, a detailed description of the calibration in step S130 in FIG. 4 will be given. It is to be noted that the description will be given for an example of black ink, the calibration is performed for other color components, for example, cyan, yellow, and magenta.

The calculation of the calibrated value in step S308 is carried out as follows.

Figure 28:
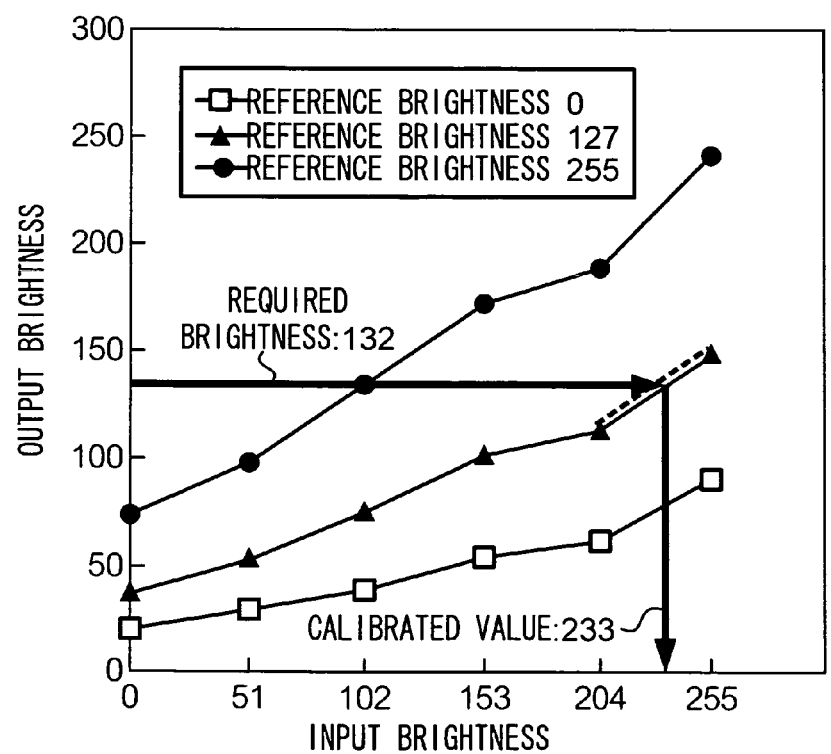
FIG. 28 shows a relationship between the output brightness and the input brightness of the nozzle #00 shown in FIG. 27.

FIG. 28 shows a relationship between the output brightness and the input brightness of the nozzle #00 shown in FIG. 27. As shown in FIG. 28, the calibration table shows input output characteristics of a target nozzle with a certain reference brightness. As described above, when the target nozzle is the nozzle #00, the reference brightness is determined as a predetermined value, 128 in this case.

It is to be noted that the calibration table shown in FIG. 27 is merely an example, and the format and contents of the calibration table are not restricted to FIG. 27. For example, although the calibration table TB4 includes data corresponding to six brightness of the target nozzle and three brightness of the reference nozzle, the number of data sets is not restricted to the embodiment. The number M of brightness of the target nozzle and the number N of brightness of the reference nozzle may be any numbers as long as they satisfy M>N. To increase the accuracy in interpolation, the number of data sets may be increased. Alternatively, to decrease storage area used for the calibration table, the number of data sets may be decreased.

6. Sixth Embodiment

A sixth embodiment of the invention will be described in this section. In the following, the difference between the fifth embodiment and the present embodiment will be mainly described. The common elements with the first embodiment will be referred with the common reference numerals.

In the fifth embodiment, the reference pixel is formed by a nozzle adjacent to the target nozzle that forms the target pixel. In the present embodiment, two reference pixels, a first reference pixel and a second reference pixel are used. The first reference pixel is the reference pixel described in the first embodiment. The second reference pixel is a pixel adjacent to the first reference pixel. Concretely, the calibration table generating system 2 of the present embodiment uses a test pattern 361 for generating the calibration table TB2, instead of the test pattern 301 used in the first embodiment.

FIGS. 29A-29C show a part of test pattern 361 in accordance with the sixth embodiment. In the basic patterns shown in FIGS. 29A-29C, brightness of the target nozzle is maintained constant at 255. In the basic patterns shown in FIGS. 29A-29C, the center, the k-th line corresponds to the target nozzle. The brightness of lines corresponding to nozzles adjacent to the target nozzle (the (k−1)th and the (k+1)th line) varies as 255, 127, and 0 in FIGS. 29A-29C, respectively. The brightness of lines corresponding to nozzles second adjacent to the target nozzle (the (k−2)th and the (k+2)th line) varies as 0 and 255 in each basic pattern. In other words, number M of brightness of the target nozzle, number $N_2$ of brightness of the first reference nozzle, and number $N_1$ of the second reference nozzle satisfy $M > N_1 > N_2$.

To obtain six-level data for a target nozzle, three-level data for a first reference nozzle, and two-level data for a second reference nozzle, it is required to use one-hundred and eighty (=6×3×2×5) basic patterns. This is because the in the basic patterns shown in FIGS. 29A-29C, the brightness of the target nozzle is constant. To obtain six data sets of a target nozzle, five groups of basic patterns are necessary as well as a group of basic patterns in FIGS. 29A-29C. In FIGS. 29A-29C, the system can obtain a data set of a target line for one line (or the line #k) of the five lines. Therefore, to obtain data sets for the five lines, four groups of basic patterns is necessary as well as a group of basic patterns in FIGS. 29A-29C. In general, to obtain M data sets for a target nozzle, $N_2$ data sets for a first reference nozzle, and $N_1$ data sets for a second reference nozzle, $5MN_1N_2$ (=$M \times N_1 \times N_2 \times 5$) basic patterns are necessary.

FIG. 30 shows a part of test pattern 361 in accordance with the sixth embodiment. In FIGS. 29A-29C, the brightness of the target nozzle is maintained constant. In FIGS. 30A-30F, the brightness of the target nozzle varies six levels. In fact, the test pattern 361 includes four more pattern groups as well as the pattern group shown in FIGS. 30A-30F.

Figure 31:
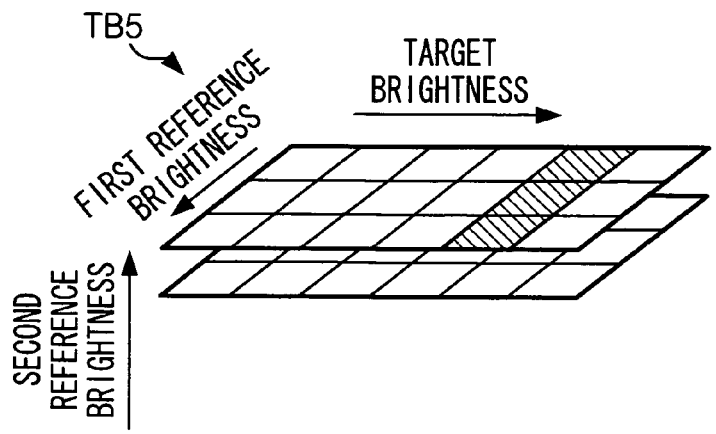
Figure 32A:
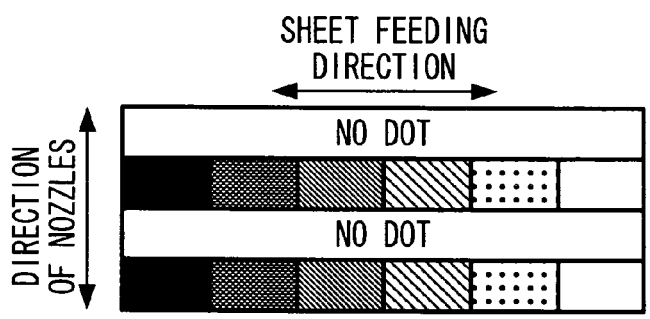
FIGS. 32A-32D shows a part of the test pattern 371
Figure 32B:
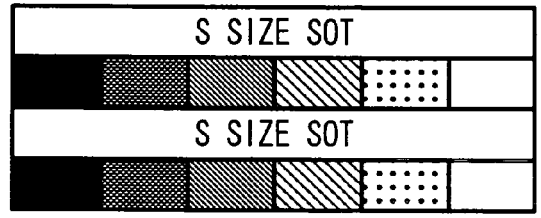
Figure 32C:
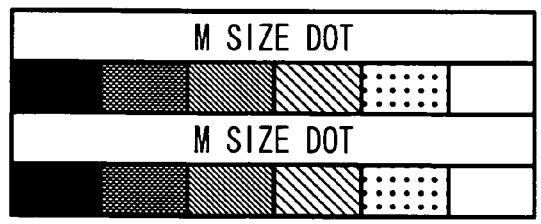
Figure 32D:
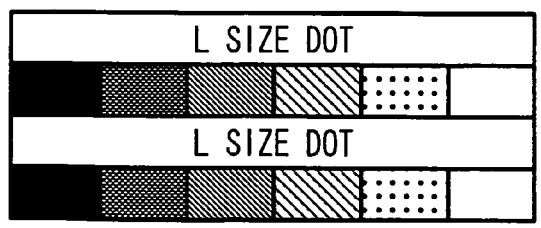

FIG. 31 schematically illustrates a structure of the calibration table TB5. As shown in FIG. 31, the calibration table TB5 has a three-dimensional structure. The calibration table TB5 includes a plurality of sub-tables. Each of the sub-tables corresponds to a brightness of the second reference nozzle. Each of the sub-tables has a structure similar to that of the calibration table TB4 in the fifth embodiment. For example, the hatched area in FIG. 31 corresponds to a target nozzle having brightness of 204, a second reference nozzle having brightness of 255, and a first reference nozzle having brightness of 0, 127, and 255.

Calibration with the calibration table TB5 is basically carried out similarly to the fifth embodiment. First, the CPU 110 of PC 100 determines the first and the second reference brightness as predetermined values (for example, 128 for both the first and the second reference brightness). The CPU 110 calculates calibrated values of the target nozzle similarly to the fifth embodiment, using the initial values and calibration table TB5. When the target nozzle is the nozzle #01, the CPU 110 determines the second reference brightness as a predetermined value (for example, 128). Also, the CPU 110 determines the first reference brightness as the calibrated value of the nozzle #00. The CPU 110 calculates calibrated values of the target nozzle using these reference values and calibration table TB5. When the target nozzle is the nozzle

02, the CPU 110 determines the first and the second reference brightness as the calibrated values of the nozzles #01 and #00, respectively. The CPU 110 calculates calibrated values of the target nozzle using these reference values and calibration table TB5. The CPU 110 calculates the calibrated values for all pixels.

According to the present embodiment, the calibration table is generated with taking characteristics of the first and the second reference nozzles into consideration. Also, the image-forming system in the present embodiment can compensate the dispersion of the physical characteristics of the nozzles, by using the calibration table taking characteristics of the first and the second reference nozzles into consideration. Thus, high quality image can be obtained.

In the present embodiment, the test pattern 361 shown in FIG. 29 is used to generate the calibration table is generated with taking characteristics of the first and the second reference nozzles into consideration. It is to be noted that the calibration table may be generated with taking dispersion in the line direction into consideration.

In the present embodiment, the second reference pixel (the second reference pixel) is adjacent to the first reference nozzle (the first reference pixel). However, the positional relationship between the first and the second reference nozzle is not restricted to the above description. The system may calibrate pixel values by using at least one reference pixel. The positional relationship between the target nozzle and the reference nozzle may satisfy a predetermined condition. Any kind of condition may be employed as the "predetermined condition".

7. Seventh Embodiment

A seventh embodiment of the invention will be described in this section. In the following, the difference between the fifth embodiment and the present embodiment will be mainly described. The common elements with the first embodiment will be referred with the common reference numerals.

In the fifth embodiment, the number N of gradation in the reference pixel satisfies M>N (M denotes the number of gradation in the target pixel). In the present embodiment, the number N equals to the number of gradation that a nozzle can represent. In the present embodiment, a nozzle can eject S, M, and L size dot. In other words, a nozzle can represent four level gradation (no dot, and S, M, and L size dot). In the present embodiment, the calibration table generating system 2 uses a test pattern 371 for generating a calibration table, instead of the test pattern 351 used in the fifth embodiment.

FIGS. 32A-32D shows a part of the test pattern 371. In FIGS. 32A-32D, patterns for the nozzles #00-#03 are shown. In the present embodiment, the reference pixel is formed by a nozzle adjacent to the target nozzle that forms the target pixel. In the basic patterns in FIGS. 32A-32D, an odd line correspond to the target nozzle. The brightness of the target nozzle (target pixel) varies as 0, 51, 102, 153, 204, and 255. In the basic patterns in FIGS. 32A-32D, the reference nozzle ejects no dot, S, M, L size dot, respectively. Similar to FIGS. 25A-25C and 25D-25F, patterns in which the odd lines and the even lines are exchanged, are necessary. To obtain calibration data for MN combinations, M patterns for the target nozzle by N patterns for the reference nozzle, 2MN basic patterns are required. In the present embodiment, image data of the test pattern is treated as binarized image data.

Figures 33, 34:
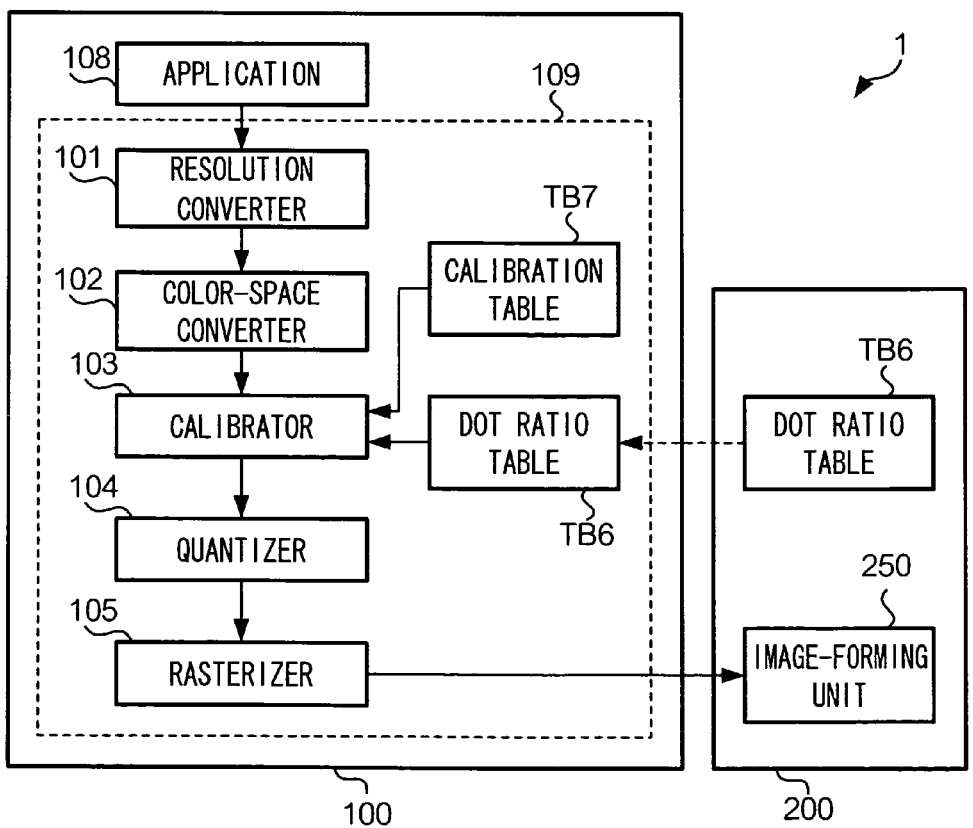
FIG. 33 shows a calibration table TB6 generated using the test pattern 371.
FIG. 34 shows a functional block diagram of the image-forming system in accordance with the seventh embodiment.

FIG. 33 shows a calibration table TB6 generated using the test pattern 371. The calibration table TB4 is generated similarly to the fifth embodiment.

7-2. Calibration (Example I)

In the fifth embodiment, the calibrated value of the reference nozzle (reference pixel) is used as an input of the reference nozzle. In the present embodiment, calibrated value of the reference nozzle is not calculated as brightness. In the present embodiment, the PC 100 calculates the relationship between the mixing ratio of S, M, and L size dot and brightness, by using a dot ratio table. The dot ratio table provides the relationship between the mixing ratio of S, M, and L size dot and brightness. The PC 100 carries out the calibration using the calculation results.

FIG. 34 shows a functional block diagram of the image-forming system in accordance with the seventh embodiment. The difference between the fifth and the seventh embodiment are as follows. The image-forming device 200 stores the calibration table TB6 instead of the calibration table TB4. In addition, the PC 100 stores a dot ratio table TB7.

FIG. 35 shows an example of the dot ratio table TB7. The CPU 110 calculates a calibrated value F by using the dot ratio table TB7 and the following equation (3).

$$F = \Sigma\{(\text{calibrated amount}) \times (\text{dot ratio})\} \qquad (3)$$

For example, when input brightness of the reference nozzle is "10", the mixing ratio of S, M, and L size dot is 0, 0.05, and 0.95, respectively. When the brightness of the target nozzle is "0", F is calculated as follows by using the equation (3)

$$F = 48 \times 0 + 29 \times 0.05 + 20 \times 0.95$$
$$= 20.45$$

FIG. 36 shows an example of a table of calibrated value F (in a case that the reference brightness is "10"). In FIG. 36, the values are rounded off to the second decimal place. The CPU 110 calculates the calibrated value by using the table shown in FIG. 36. For example, in a case that the input brightness of the target nozzle is "20", the calibrated value is calculated by linear interpolation using data of input brightness "0" and "51". Operations after the calibrated value is calculated, are performed similarly to the fifth embodiment.

7-3. Calibration (Example II)

Method for obtain the relationship between the dot size and brightness is not restricted to the description in section 7-2. For example, in the calibration table TB6, the dot size of the reference nozzle may be converted into brightness. To convert the dot size into brightness, a dot ratio table TB7 shown in FIG. 35 is used. For example, to convert dot size "L" into brightness, a data set in which the ratio of dot size L is 1.00 (in this case, corresponding to brightness zero) is used. According to the calibration table TB7, dot size L, M, S, and no dot are converted into brightness 0, 85, 170, and 255, respectively.

FIG. 37 shows a table obtained by converting the dot size into brightness. In other words, the calibration table TB4 is equivalent to the table in FIG. 37. The CPU 110 carries out the calibration by using the table shown in FIG. 37. Operations after the calibrated value is calculated, are performed similarly to the fifth embodiment.

7-4. Calibration (Example III)

It is to be noted that there is a case that the method described in section 3-3 cannot be used. In other words, the calibration table TB6 is equivalent to the table in FIG. 37 unless the dot ratio table TB7 satisfies a predetermined condition. Specifically, the condition is that a data set includes ratio 1.00 for a size. For example, in the dot ratio table TB5, the ratio is 1.00 when the brightness is 170. However, according to a method of binarization, no data set includes ratio 1.00 for any size. In this case, the method in section 7-3 cannot be used. In this section, a method that can be used in this case, is described.

FIG. 38 shows an example of a part of a dot ratio table TB8 in the seventh embodiment. In the present embodiment, brightness is determined on the basis of a certain size dot (for example, L size dot). According to the example shown in FIG. 6, the density of M size dot is 70% of L size dot and that of S size dot is 30% of L size dot. In other words, a conversion coefficient R for M size dot is 0.7. The CPU 110 converts the dot size into brightness C by using R and the following equation (4).

$$C = C_{max} - (C_{max} \times R) \quad (4)$$

Here, $C_{max}$ denotes the maximum value of the gradation (in this case, $C_{max}$=255). According to equation (4), brightness of L, M, and S size dot are calculated as 0, 77, and 178, respectively. The CPU 110 performs calibration similar to description in section 3-3.

In the present embodiment, the dot size is converted into brightness relative to L size dot. It may be converted relative to M or S size dot.

8. Further Embodiments

In the above described embodiments, the invention is applied to an image-forming system such as a line head printer. However, the invention can be applied to devices other than the image-forming device. For example, the invention may be applied to a display device that displays an image by dot matrix, such as a liquid crystal display device or a so-called plasma display device, in other words, a display device that forms an image by visible radiation. In this case, a test pattern described in the above embodiments is displayed on the device. Then, the calibration table generating system measures the brightness of a dot and generates a calibration table on the basis of the measurement results. The calibration table is unique to the display device. The display device stores the calibration table.

The display device carries out the calibration using the calibration table. A method for generating the calibration table and for calibrating is similar to those described in the above embodiments.

In the above described embodiments, the reference pixel is adjacent to the target pixel. However, the positional relationship between the target pixel and the reference pixel is not restricted to the embodiments. The reference pixel may be a pixel that satisfies a predetermined positional condition. Any kind of condition may be employed as the "predetermined condition". For example, the reference pixel may be a second adjacent pixel to the target pixel.

What is claimed is:

1. An image processing device, comprising:
   a memory that stores a table, the table including a pixel value of a target pixel, a pixel value of a reference pixel, and a pixel value corresponding to the pixel values of the target pixel and the reference pixel, the target pixel and the reference pixel being included in an image shown by image data, the image including a plurality of pixels, each of the plurality of pixels having a pixel value, the reference pixel being a pixel other than the target pixel;
   a calibrator that calibrates a pixel value of a pixel included in the image shown by the image data, by using the table stored in the memory; and
   an output interface that outputs to an image output device the image data calibrated by the calibrator, the image output device forming an output image in accordance with the calibrated image data,
   wherein the reference pixel and the target pixel have a predetermined positional relationship.

2. An image-processing device according to claim 1, wherein
   the image output device is an image-forming device having a plurality of nozzles, each of which ejects an ink droplet.

3. An image-processing device according to claim 1, wherein
   the image output device is a display device that forms the output image by visible radiation.

4. An image-processing device according to claim 2, wherein
   the reference pixel is a pixel formed by a reference nozzle that has a predetermined positional relationship with a target nozzle, the target nozzle being a nozzle that is used to form the target pixel.

5. An image processing device according to claim 4, wherein
   the reference nozzle is adjacent to the target nozzle.

6. An image processing device according to claim 2, wherein
   the reference pixel is formed by a target nozzle, the target nozzle being used to form the target pixel.

7. An image processing device according to claim 1, wherein
   the table includes the pixel value of the target pixel, a pixel value of a first reference pixel, a pixel value of a second reference pixel, and a pixel value corresponding to the pixel values of the target pixel and the first and the second reference pixels, the first reference pixel and the target pixel having a predetermined positional relationship, the second reference pixel and the target pixel having another predetermined positional relationship.

8. An image-processing device according to claim 7, wherein:
   the first reference pixel is adjacent to the target pixel; and
   the second reference pixel is adjacent to the first reference pixel.

9. An image-processing device according to claim 1, wherein:
   the memory stores at least a first table and a second table; and
   a first line and a second line are orthogonal, the first line including a target pixel and a reference pixel of the first table, the second line including a target pixel and a reference pixel of the second table.

10. An image-processing device according to claim 1, wherein
    the table includes M-number of pixel values of the target pixel and N-number of pixel values of the reference pixel, the numbers M and N being integers that satisfy M>N.

11. An image processing device according to claim 10, wherein
    the number M equals a number of gradation that a reference nozzle can represent, the reference nozzle being a nozzle that forms the reference pixel.

12. An image processing device according to claim 10, wherein:
    the table includes pixel values of at least two reference pixels, the two reference pixels including a first reference pixel and a second reference pixel;
    a distance between the second reference pixel and the target pixel is less than a distance between the first reference pixel and the target pixel; and
    the table includes M-number of pixel values of the target pixel, N1-number of pixel values of the first reference pixel, and N2-number of pixel values of the second reference pixel, the numbers M, N1, and N2 being integers that satisfy M>N2>N1.

13. An image processing device according to claim 12, wherein:
the second reference pixel is adjacent to the target pixel; and
the first reference pixel is adjacent to the second reference pixel.

14. An image processing device according to claim 13, wherein the reference nozzle is adjacent to the target nozzle.

15. An image processing device according to claim 10, wherein
the reference pixel is a pixel formed by a reference nozzle, the reference nozzle satisfying a predetermined positional condition relative to a target nozzle, the target nozzle corresponding to the target pixel.

16. An image-processing method, comprising:
reading a table from a memory, the table including a pixel value of a target pixel, a pixel value of a reference pixel, and a pixel value corresponding to the pixel values of the target pixel and the reference pixel, the target pixel and the reference pixel being included in an image shown by image data, the image including a plurality of pixels, each of the plurality of pixels having a pixel value, the reference pixel being a pixel other than the target pixel;
calibrating a pixel value of a pixel included in the image shown by the image data, by using the table stored in the memory; and
outputting to an image output device the image data calibrated by the calibrator, the image output device forming an output image in accordance with the calibrated image data,
wherein the reference pixel and the target pixel have a predetermined positional relationship.

17. A tangible computer readable medium storing a program for causing a computer device to execute:
reading of a table from a memory, the table including a pixel value of a target pixel, a pixel value of a reference pixel, and a pixel value corresponding to the pixel values of the target pixel and the reference pixel, the target pixel and the reference pixel being included in an image shown by image data, the image including a plurality of pixels, each of the plurality of pixels having a pixel value, the reference pixel being a pixel other than the target pixel;
calibrating of a pixel value of a pixel included in the image shown by the image data, by using the table stored in the memory; and
outputting to an image output device the image data calibrated by the calibrator, the image output device forming an output image in accordance with the calibrated image data,
wherein the reference pixel and the target pixel have a predetermined positional relationship.

* * * * *